United States Patent
Estrada et al.

(10) Patent No.: US 12,488,225 B1
(45) Date of Patent: Dec. 2, 2025

(54) MODULAR OPEN SYSTEM ARCHITECTURE FOR COMMON INTELLIGENCE PICTURE GENERATION

(71) Applicant: Royce Geospatial Consultants, Inc., Arlington, VA (US)

(72) Inventors: Adam Estrada, Reston, VA (US); Dave Rabrun, Rockville, MD (US); Matthew Berra, Alexandria, VA (US); Kevin Naquin, Erie, CO (US); Michael Ludlam, Tampa, FL (US); Kristen E. Mistysyn, Erie, CO (US); Nicholas Stephens, Thornton, CO (US); Jeffery Harlan, Ellicott City, MD (US)

(73) Assignee: ROYCE GEOSPATIAL CONSULTANTS, INC., Arlington, VA (US)

( * ) Notice: Subject to any disclaimer, the term of this patent is extended or adjusted under 35 U.S.C. 154(b) by 0 days.

(21) Appl. No.: 19/063,602

(22) Filed: Feb. 26, 2025

Related U.S. Application Data

(63) Continuation-in-part of application No. 19/048,902, filed on Feb. 8, 2025.

(51) Int. Cl.
 *G06N 3/0475* (2023.01)
 *G06N 3/063* (2023.01)
 *G06N 3/092* (2023.01)

(52) U.S. Cl.
 CPC .......... *G06N 3/0475* (2023.01); *G06N 3/063* (2013.01); *G06N 3/092* (2023.01)

(58) Field of Classification Search
 CPC ...... G06N 3/0475; G06N 3/092; G06N 3/063; H04B 7/18519; G01W 1/00
 See application file for complete search history.

(56) References Cited

U.S. PATENT DOCUMENTS 10,387,728 B2   8/2019   Arya et al.
10,839,211 B2   11/2020  Reinstein et al.
(Continued)

OTHER PUBLICATIONS

Kurihana, Takuya, et al. "Scalable Multi-Facility Workflows for Artificial Intelligence Applications in Climate Research." SC24-W: Workshops of the International Conference for High Performance Computing, Networking, Storage and Analysis. IEEE, 2024. (Year: 2024).*

(Continued)

*Primary Examiner* — Randall K. Baldwin
(74) *Attorney, Agent, or Firm* — Galvin Patent Law LLC; Brian R Galvin

(57) ABSTRACT

A modular open system architecture for common intelligence picture generation is disclosed. The system receives intelligence requirements through a multimodal artificial intelligence system and calculates collection feasibility across multiple intelligence sources based on physical and temporal conditions. The system develops integrated collection plans through the containerized analytics workbench using containerized analytics modules and processes intelligence through GPU-accelerated deep learning models for automated target recognition. Satellite collection is orchestrated through satellite data acquisition optimization platform by evaluating weather conditions, orbital parameters, and sensor capabilities, while space domain awareness is maintained through space domain awareness system for real-time collection asset management. Multi-source intelligence data is fused through multi-source intelligence fusion system to populate a common intelligence picture. The system implements automated workflows for intelligence analysis and dissemination while maintaining security controls, with the containerized analytics workbench providing pattern of life analysis and dynamic exploitation through containerized microservices.

14 Claims, 17 Drawing Sheets

(56) References Cited

U.S. PATENT DOCUMENTS

| | | |
|---|---|---|
| 11,189,032 B2 | 11/2021 | Ma et al. |
| 11,256,916 B2 | 2/2022 | She et al. |
| 11,423,785 B2 | 8/2022 | Fridman et al. |
| 11,526,723 B2 | 12/2022 | Yang et al. |
| 11,544,832 B2 | 1/2023 | Lowe et al. |
| 11,694,354 B2 | 7/2023 | Strong |
| 12,262,036 B1 * | 3/2025 | Galvin ............... H04N 19/42 |
| 2008/0117104 A1 * | 5/2008 | Lin .................. G01S 19/28 342/357.31 |
| 2016/0020848 A1 * | 1/2016 | Leonard ............ H04B 10/118 370/316 |
| 2021/0295546 A1 | 9/2021 | He et al. |
| 2021/0319370 A1 | 10/2021 | Schneider |
| 2022/0091607 A1 | 3/2022 | Zang |
| 2023/0146181 A1 | 5/2023 | Meshkin et al. |
| 2024/0031846 A1 | 1/2024 | Mengwasser et al. |
| 2025/0062826 A1 * | 2/2025 | Delima ............ H04B 7/18519 |
| 2025/0077216 A1 * | 3/2025 | Nair ................ H04L 67/101 |
| 2025/0131827 A1 * | 4/2025 | Motamedi ............ G07C 5/008 |

OTHER PUBLICATIONS

Anagnostopoulos, Christos, et al. "Multimodal federated learning in AIoT systems: Existing solutions, applications, and challenges." IEEE Access (2024). (Year: 2024).*

* cited by examiner

MODULAR OPEN SYSTEM ARCHITECTURE FOR COMMON INTELLIGENCE PICTURE GENERATION

CROSS-REFERENCE TO RELATED APPLICATIONS

Priority is claimed in the application data sheet to the following patents or patent applications, each of which is expressly incorporated herein by reference in its entirety: Ser. No. 19/048,902

BACKGROUND OF THE INVENTION

Field of the Art

The present invention relates to intelligence analysis systems, and more particularly to modular architectures for generating and maintaining a common intelligence picture through automated multi-source data integration and analysis. The invention provides an optimization to satellite data acquisition and intelligence processing through containerized analytics and multimodal artificial intelligence, integrating multiple intelligence sources while maintaining security controls through specialized components including a containerized analytics workbench, satellite data acquisition optimization platform, space domain awareness system, and a multi-source intelligence fusion system.

Discussion of the State of the Art

Satellite-based data acquisition systems face increasing complexity in managing and optimizing collection opportunities across multiple platforms, environmental conditions, and operational constraints. Traditional approaches to satellite data collection often rely on fixed scheduling systems or manual coordination, which fail to adequately address the dynamic nature of orbital operations and varying environmental conditions. While the disclosure of U.S. Pat. No. 11,861,894 B1, titled "TARGET CUSTODY PLATFORM FOR MODELING TARGET NAVIGATION TRAJECTORY WITH CONFIDENCE INTERVALS," which is hereby incorporated by reference in its entirety, provides methods for target custody tracking and trajectory modeling with confidence intervals, and the disclosure of U.S. Pat. No. 11,961,172 B1, titled "ADVANCED IMAGE ENHANCEMENTS FOR ACCURATE PROCESSING, EXPLOITATION, AND DISSEMINATION," which is hereby incorporated by reference in its entirety, provides methods for enhancing image processing capabilities, the proliferation of commercial satellite services has further complicated this landscape by introducing additional variables that must be considered when planning and executing data collection operations.

Inefficient satellite data acquisition strategies often result in significant waste of both financial and organizational resources. When collection opportunities yield suboptimal or unusable data due to unforeseen environmental conditions, poor timing, or inappropriate sensor selection, organizations must often repeat collections, leading to project delays. This inefficiency is particularly problematic given the limited availability of satellite resources. Moreover, the time-sensitive nature of many collection requirements means that failed or inadequate collection attempts can result in missed opportunities that may not recur for extended periods. While U.S. Pat. No. 11,861,894 B1 addresses some aspects of these challenges through target custody tracking and trajectory modeling with confidence intervals, there remains a need for comprehensive optimization of satellite data acquisition, particularly when dealing with dynamic environmental conditions and multiple collection assets.

Current satellite tasking systems primarily focus on single-platform optimization or basic scheduling algorithms, without mechanisms for real-time adaptation to changing conditions such as weather patterns, orbital dynamics, and varying collection requirements. Although U.S. Pat. No. 11,861,894 B1 addresses aspects of target tracking and trajectory prediction, existing systems typically lack the sophistication to handle complex multi-variable optimization that modern applications demand. This limitation becomes particularly acute in scenarios requiring rapid response timing or operating under challenging environmental conditions. Satellite-based data acquisition systems face increasing complexity in managing and optimizing collection opportunities across multiple platforms, environmental conditions, and operational constraints. Traditional approaches to satellite data collection often rely on fixed scheduling systems or manual coordination, which fail to adequately address the dynamic nature of orbital operations and varying environmental conditions. While U.S. Pat. No. 11,861,894 B1 provides methods for modeling target navigation trajectories with confidence intervals, the proliferation of commercial satellite services has further complicated this landscape by introducing additional variables that must be considered when planning and executing data collection operations. Furthermore, modern satellite data acquisition must integrate with sophisticated processing frameworks such as PID and TARGET CUSTODY engines CURVE OE systems for TCPED (Tasking, Collection, Processing, Exploitation, and Dissemination), and advanced AI/ML computing capabilities at the edge. These systems, working in concert with OSINT, SIGNET/RF/Acoustic, and GEOINT data sources, create a complex data ecosystem that must be efficiently managed and orchestrated.

Most existing satellite data acquisition systems rely either on predetermined collection windows that cannot adapt to changing conditions, or on simplistic prioritization schemes that fail to optimize resource utilization effectively. The challenge of balancing collection requirements with system constraints and environmental conditions remains largely unresolved. Furthermore, these systems often lack the ability to dynamically reassign collection tasks or adjust their collection strategy in response to real-time changes in weather, satellite availability, or mission priorities.

What is needed is a data acquisition system that seamlessly integrates dynamic optimization capabilities with satellite tasking technologies, enabling efficient and adaptive collection planning in complex, real-world environments. Building upon the target custody and trajectory modeling capabilities disclosed in U.S. Pat. No. 11,861,894 B1, such a system must be capable of managing multiple collection opportunities while maintaining high data quality standards, all while scaling efficiently across varying operational conditions and adapting to changing environmental and mission requirements.

Modern intelligence analysis faces increasing challenges in integrating and processing data from multiple sources including satellite imagery, cyber indicators, OSINT, and commercial tracking data. While individual tools exist for specific types of analysis, current systems lack comprehensive architectures for seamlessly combining multiple analysis modalities into a unified intelligence picture. Traditional approaches often rely on manual correlation of data from different sources, leading to delays in intelligence production and potential missed connections between different types of indicators.

Current systems typically focus on single domains-either space, cyber, or traditional intelligence-without providing mechanisms for cross-domain correlation and analysis. Additionally, existing platforms lack sophisticated automation capabilities for repetitive analytical tasks, requiring significant manual effort for routine analysis operations. The challenge of maintaining comprehensive situational awareness across multiple domains while enabling rapid intelligence production remains largely unresolved. What is needed is a system that must integrate GPU-accelerated deep learning models for automated target recognition and optimize collection across satellite, signals intelligence, and open-source intelligence resources through specialized components. It requires a Containerized analytics workbench implementing pattern of life analysis and dynamic exploitation through containerized microservices, Satellite data acquisition optimization platform for optimizing satellite collection across multiple providers based on physical feasibility and temporal constraints, and Space domain awareness system for maintaining real-time collection asset management. The system must fuse multi-source intelligence data through multi-source intelligence fusion system to populate a common intelligence picture while implementing automated workflows for intelligence analysis and dissemination. Furthermore, it must calculate collection feasibility across multiple intelligence sources based on physical and temporal conditions while orchestrating satellite collection through evaluation of weather conditions, orbital parameters, and sensor capabilities. Such a system should enable comprehensive optimization of intelligence collection and analysis while maintaining appropriate security controls throughout the analytical process.

SUMMARY OF THE INVENTION

Accordingly, the inventor has conceived and reduced to practice, a modular architecture for generating and maintaining the Common Intelligence Picture through automated multi-source data integration and analysis. At the core is the multi-source intelligence fusion system large language model (LLM), which acts as an interactive question-and-answer system that processes and responds to Priority Intelligence Requirements (PIRs). The multi-source intelligence fusion system analyzes incoming PIRs and automatically generates appropriate courses of action, which may include tasking satellites, initiating OSINT collection, directing CYBER operations, or coordination other intelligence gathering activities. These courses of action are then executed through the satellite data acquisition optimization platform, which coordinates with the containerized analytics workbench and other components to populate the Common Intelligence Picture (CIP). The system implements multiple specialized components working in concert that map directly to the joint intelligence process cycle, Planning and Direction: The multi-source intelligence fusion system LLM processes PIRs and generates automated courses of action; Collection: the satellite data acquisition optimization platform executes multi-source collection including satellite tasking, OSINT gathering, and CYBER operations; Processing: Containerized analytics implements automated data processing and enhancement; Analysis and Exploitation: GPU-accelerated deep learning models conduct automated analysis while maintaining the CIP; Dissemination: automated report generation system produces customized intelligence products including PDFs and presentations. The system calculates collection feasibility across multiple intelligence sources based on physical and temporal conditions while orchestrating satellite collection through evaluation of weather conditions, orbital parameters, and sensor capabilities, integrating satellite, signals intelligence, and open-source intelligence resources. Throughout the intelligence cycle, the system maintains automated workflows for intelligence analysis and dissemination while implementing comprehensive feedback mechanisms that continuously update the common intelligence picture based on user interactions and new information.

The multi-source intelligence fusion system LLM represents a significant advancement in automated intelligence processing through its ability to understand and respond to Priority Intelligence Requirements (PIRs) with contextually appropriate courses of action. When a PIR is received, the multi-source intelligence fusion system analyzes the requirement using sophisticated natural language processing to understand the intelligence needs, temporal constraints, and operational context. Based on this analysis, The multi-source intelligence fusion system automatically generates comprehensive courses of action that may span multiple intelligence disciplines. For example, when responding to a PIR about specific activity at a facility of interest, The multi-source intelligence fusion system might generate a course of action that includes: tasking specific satellite collections with optimal timing and sensor configurations; initiating targeted OSINT collection focusing on relevant public data sources; coordinating CYBER operations to gather additional intelligence; establishing automated monitoring of signals intelligence feeds; and setting up pattern of life analysis workflows. These courses of action are transmitted to the satellite data acquisition optimization platform, which coordinates their execution across the architecture. As intelligence is collected and processed, the containerized analytics workbench components continuously update the Common Intelligence Picture. The system automatically generates intelligence products tailored to different user needs, ranging from detailed technical reports to executive summaries, with all products maintaining direct links to the underlying intelligence data in the CIP. The dissemination system supports multiple product formats including interactive displays, PDFs, and presentations while the feedback system enables users to provide input directly through or on derivative products. This feedback is automatically processed and incorporated to update the CIP/COP, ensuring intelligence products remain current and responsive to evolving requirements. Space domain awareness system for real-time collection asset management; GPU-accelerated deep learning models for automated target recognition; multi-source intelligence fusion System for fusing multi-source intelligence data; Satellite data acquisition optimization platform for optimizing satellite collection across multiple providers based on physical feasibility, temporal constraints and competitive tasking conditions; and an automated course of action generation system leveraging large language models (LLMs) for rapidly developing and evaluating response options to priority intelligence requirements. The automated course of action system processes intelligence requirements through sophisticated prompting architectures that enable dynamic reasoning about complex scenarios while maintaining operational security constraints. The system calculates collection feasibility across multiple intelligence sources based on physical and temporal conditions while orchestrating satellite collection through evaluation of weather conditions, orbital parameters, and sensor capabilities, integrating satellite, signals intelligence, and open-source intelligence resources. The LLM-based course of action generation capability automatically evaluates multiple response options against established criteria including resource availability, timeline constraints, and mission objectives while providing detailed rationales for recommended courses of action.

According to an additional embodiment, An adaptive satellite data acquisition optimization platform. The automated satellite data acquisition optimization system described herein provides a comprehensive solution for efficiently managing and enhancing satellite-based data collection operations. The system leverages multiple data collection modalities including SAR, EO, and RF sensors, while incorporating edge computing capabilities for real-time processing and exploitation. Through integration with systems such as edge processing and the CURVE OE for TCPED, SENSE MAKING and object-based production (OBP), the platform enables comprehensive collection orchestration across the entire data ecosystem. Extending the trajectory modeling and confidence interval calculations disclosed in U.S. Pat. No. 11,861,894 B1, the system integrates real-time analysis of multiple variables including but not limited to weather conditions, orbital parameters, sensor capabilities, and collection requirements to determine optimal data acquisition opportunities. Through continuous monitoring and assessment of both physical feasibility factors such as satellite status, terrain obstructions, and environmental conditions, alongside competitive feasibility considerations including orbit availability and targeting geometries, the system automatically selects and tasks the most suitable collection assets to fulfill user requirements.

The system further enhances its capabilities through sophisticated data processing and quality assurance measures. After collection, satellite data undergoes advanced enhancement procedures that improve image quality by reducing atmospheric interference, correcting geolocation errors, and enhancing resolution. These improvements significantly increase the utility of collected data for downstream applications, with demonstrated performance improvements in computer vision applications. The system maintains comprehensive quality control throughout the entire workflow, from initial collection planning through final data delivery, ensuring optimal resource utilization and data quality while minimizing waste and reducing the need for repeat collections. This integrated approach to satellite data acquisition and enhancement represents a significant advancement in the efficient utilization of satellite resources for data collection operations.

According to a preferred embodiment, a computer-implemented method for an adaptive satellite data acquisition optimization platform, the computer-implemented method comprising the steps of: receiving a work order that utilize a first plurality of satellite assets; calculating a physical and temporal feasibility based on a plurality of physical and temporal conditions for the first plurality of satellite assets; identifying a second plurality of satellite assets wherein the temporal and physical conditions allow the second plurality of satellite assets to viable complete the work order; collecting a plurality of physical data to determine physical conditions, wherein the physical data includes at least Earth weather, space weather, and geographical conditions; developing a data collection plan based on the determined physical and temporal feasibilities and a plurality of capabilities of the second plurality of satellite assets; and fulfilling the work order using an optimally selected satellite asset from the second plurality of satellite assets, wherein the optimally selected satellite is most capable of completing the work order based on the physical and temporal feasibilities, is disclosed.

According to a preferred embodiment, a computing system for an adaptive satellite data acquisition optimization platform, the computing system comprising: one or more hardware processors configured for: receiving a work order that utilize a first plurality of satellite assets; calculating a physical and temporal feasibility based on a plurality of physical and temporal conditions for the first plurality of satellite assets; identifying a second plurality of satellite assets wherein the temporal and physical conditions allow the second plurality of satellite assets to viable complete the work order; collecting a plurality of physical data to determine physical conditions, wherein the physical data includes at least Earth weather, space weather, and geographical conditions; developing a data collection plan based on the determined physical and temporal feasibilities and a plurality of capabilities of the second plurality of satellite assets; and fulfilling the work order using an optimally selected satellite asset from the second plurality of satellite assets, wherein the optimally selected satellite is most capable of completing the work order based on the physical and temporal feasibilities, is disclosed.

According to a preferred embodiment, A system for an adaptive satellite data acquisition optimization platform, comprising one or more computers with executable instructions that, when executed, cause the system to: receive a work order that utilize a first plurality of satellite assets; calculate a physical and temporal feasibility based on a plurality of physical and temporal conditions for the first plurality of satellite assets; identify a second plurality of satellite assets wherein the temporal and physical conditions allow the second plurality of satellite assets to viable complete the work order; collect a plurality of physical data to determine physical conditions, wherein the physical data includes at least Earth weather, space weather, and geographical conditions; develop a data collection plan based on the determined physical and temporal feasibilities and a plurality of capabilities of the second plurality of satellite assets; and fulfill the work order using an optimally selected satellite asset from the second plurality of satellite assets, wherein the optimally selected satellite is most capable of completing the work order based on the physical and temporal feasibilities, is disclosed.

According to an aspect of an embodiment, the plurality of capabilities includes at least spatial resolution, spectral capabilities, and basic orbital parameters.

BRIEF DESCRIPTION OF THE DRAWING FIGURES

DETAILED DESCRIPTION OF THE INVENTION

Figure 1:
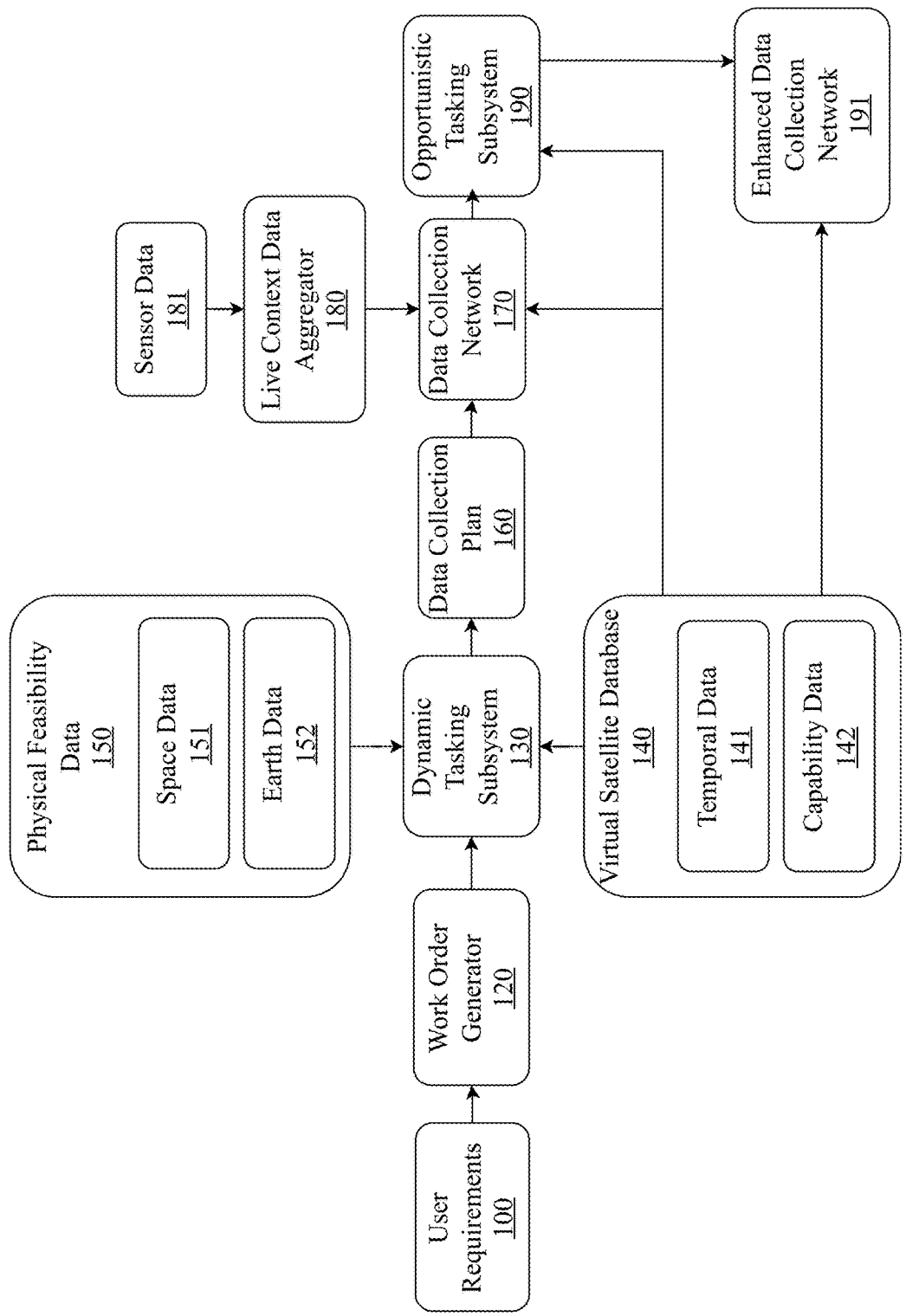
FIG. 1 is a block diagram illustrating an exemplary system architecture for an adaptive satellite data acquisition optimization platform.

The inventor has conceived and reduced to practice a common intelligence picture through automated multi-source data integration and analysis. This comprises one or more hardware processors configured to execute a series of specialized components for intelligence processing and satellite data optimization. The system receives intelligence requirements through a multimodal artificial intelligence system that automatically analyzes and prioritizes incoming requirements based on mission criticality, temporal urgency, and resource availability. The system calculates collection feasibility across multiple intelligence sources based on physical and temporal conditions while dynamically adjusting collection priorities to address time-sensitive intelligence requirements. The system identifies available collection assets including satellite, signals intelligence, and open-source intelligence resources while collecting environmental and operational data to determine collection conditions. The system develops an integrated collection plan through the containerized analytics workbench using containerized analytics modules, with automated prioritization of collection tasks based on intelligence requirement urgency. Intelligence collection is processed through GPU-accelerated deep learning models for automated target recognition with expedited processing paths for high-priority requirements. Satellite collection is orchestrated through satellite data acquisition optimization platform, which evaluates weather conditions, orbital parameters, and sensor capabilities while maintaining priority-based tasking protocols. Space domain awareness is maintained through Space domain awareness system, providing real-time collection asset management with dynamic resource allocation based on requirement priorities. Multi-source intelligence data is fused through multi-source intelligence fusion system to populate a common intelligence picture, implementing sophisticated algorithms to ensure rapid processing of priority intelligence. The containerized analytics workbench implements pattern of life analysis, object-based production, computer vision processing, and dynamic exploitation through containerized microservices, with automated workflows optimized for rapid response to critical requirements. Additionally, the Satellite data acquisition optimization platform component optimizes satellite collection across multiple providers based on physical feasibility, temporal constraints and competitive tasking conditions, maintaining priority queuing for time-sensitive collections. Throughout these operations, the system implements automated workflows for intelligence analysis and dissemination while maintaining security controls, ensuring expedited handling of priority intelligence requirements through automated tipping and cueing between collection assets.

Building upon the target custody platform disclosed in U.S. Pat. No. 11,861,894 B1, the system and method for optimizing satellite data acquisition that dynamically manages the complex process of collecting and processing satellite imagery. The system employs algorithms to evaluate multiple real-time conditions including weather patterns, orbital dynamics, and sensor capabilities to determine the most effective collection opportunities. By integrating with established target custody tracking methodologies, and continuously monitoring physical constraints such as terrain interference and environmental conditions, while simultaneously considering operational factors like satellite availability and collection geometry, the system automatically orchestrates data collection tasks across available satellite resources to maximize collection success rates and operational efficiency.

The invention extends beyond initial data collection by incorporating advanced processing capabilities that significantly enhance the quality and usability of acquired data. The system applies enhancement algorithms to improve image clarity, correct positioning errors, and optimize resolution, resulting in substantially improved performance in downstream analytical applications. Through comprehensive quality control measures and continuous optimization of both collection and enhancement processes, the system ensures consistent, high-quality data products while minimizing resource waste and operational inefficiencies. This holistic approach to satellite data acquisition management represents a substantial improvement in the field of satellite-based data collection and processing.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "constellation" refers to a collection of one or more satellite assets that may be utilized for data collection operations, regardless of ownership or operational control. Building upon the target custody tracking systems described in U.S. Pat. No. 11,861,894 B1, a constellation may comprise satellites from single or multiple vendors, with varying capabilities, orbital parameters, and operational characteristics. The constellation incorporates diverse sensor types including SAR, EO, and RF capabilities as shown in the system architecture. Through integration with the CURVE OE workbench and Slingshot edge computing capabilities, these constellations can be dynamically tasked and managed to support both persistent surveillance and dynamic collection requirements. In the invention, constellations are treated as virtual resources that can be dynamically accessed and tasked based on collection requirements and real-time conditions. The term encompasses both physical satellite groups operated by a single entity and virtual groupings created by aggregating access to multiple independent satellite systems. Historically, constellation management has been limited to coordinating assets within a single operator's control. The invention expands this concept to enable seamless integration and optimization across multiple independent constellation resources, treating disparate satellite assets as components of a unified virtual constellation that can be orchestrated to maximize collection efficiency and success rates. This virtual constellation approach enables flexible resource allocation and dynamic tasking across available assets regardless of their ownership or operational origin.

Conceptual Architecture

FIG. 1 is a block diagram illustrating an exemplary system architecture for an adaptive satellite data acquisition optimization platform. The platform begins with user requirements 100 that are input into a work order generator 120. The work order generator 120 formalizes these requirements into structured collection parameters that can be processed by downstream components.

The dynamic tasking subsystem 130 serves as a central processing hub, orchestrating the complex interplay between collection requirements and operational constraints. This subsystem continuously processes inputs from the work order generator 120, which translates user requirements into machine readable collection parameters such as desired ground sample distance, collection timing, and coverage specifications. Satellite data acquisition optimization platform analyzes requirements against historic local/space weather and constellation capabilities including orbital coverage and revisit cadence via vendor feasibility APIs. The system's processing algorithms evaluate these requirements against real world collection conditions and constraints to determine optimal collection strategies, achieving a 94% persistent collection rate.

The Physical Feasibility Logic system enhances the Feasibility Analyzer to incorporate comprehensive checks for both X-band and S-band communication conditions. The implementation utilizes data parameters defined in Space Data 151 and Earth Data 152 components to assess communication viability. For X-band interference assessment, the system evaluates three primary factors: solar interference using solar activity levels and radiation intensity data, ionospheric impacts using ionospheric disturbance measurements, and terrain masking effects based on geographical composition data. These analyses determine potential impacts on X-band uplink performance in the military X-band frequency range of 7.9-8.4 GHZ. The S-band weather impact assessment focuses on three key atmospheric conditions defined in Earth Data 152: atmospheric signal loss calculated from cloud cover, wind conditions, and temperature profiles. The system analyzes precipitation effects from cloud cover data and assesses visibility using atmospheric visibility measurements. These assessments predict potential degradation of S-band downlink performance in the 2.2-2.3 GHz range.

Geographic constraints analysis considers both frequency bands, evaluating target location parameters including latitude, longitude, and elevation. This analysis is enhanced through integration with RF to GEOINT fusion capabilities and the broader partner community infrastructure shown in the system architecture. The analysis accounts for terrain features affecting signal propagation, local weather patterns impacting transmission quality, and location-specific frequency restrictions. Through the CURVE OE framework, the system can dynamically adjust collection parameters based on Pattern of Life analysis and structured observations of target data. The system integrates with weather and space weather APIs for current environmental data, automatically requesting updates for parameters including cloud cover, precipitation, wind speed, temperature, visibility, solar activity, radiation levels, and ionospheric state. This integration triggers feasibility reassessment when significant changes occur. These components generate a comprehensive feasibility assessment indicating X-band uplink and S-band downlink communication viability for each collection opportunity. This continuously updated assessment informs the Task Optimizer and Priority Scheduler for communication resource allocation decisions. The implementation maintains strict adherence to FIG. 4 data flows while providing flexibility for varying operational conditions and requirements.

The platform incorporates comprehensive physical feasibility data 150 through two primary categories. Space data 151 includes parameters such as but not limited to solar activity levels, geomagnetic conditions, ionospheric disturbances, and charged particle densities that could impact collection quality. Earth data 152 includes but is not limited to atmospheric conditions including cloud cover percentages, precipitation forecasts, visibility levels, wind conditions at various altitudes, and terrain interference factors. For example, when planning a collection over a mountainous region, the system evaluates terrain shadows, cloud formations typical to mountainous areas, and seasonal snow cover patterns to determine optimal collection windows.

The system incorporates comprehensive feasibility analysis through, which automatically calculates collection feasibilities for a plurality of considerations per month by analyzing requirements against historical local/space weather and constellation capabilities including orbital coverage and revisit cadence via vendor feasibility APIs. The analysis builds the Data Collection Plan, which determines the down selected list of imaging vendors meeting requirements for upcoming Looks. This approach significantly mitigates program risk by leveraging 50+ on orbit collection assets across vendors to overcome space-based challenges due to resolution, local/space weather, illumination, terrain obstructions and competition.

A virtual satellite database 140 functions as a dynamic repository of satellite resource information, continuously updated to reflect current constellation states and capabilities. The database maintains temporal data 141 that includes but is not limited to detailed orbital parameters such as satellite position, velocity vectors, and predicted overhead passes, along with scheduling constraints and collection windows. This temporal information aids in determining when specific satellites will have physical access to target areas. The database also maintains capability data 142 that catalogs each satellite's operational characteristics, including but not limited to spatial resolution capabilities (e.g., 30 cm to 1m ground sample distance), available spectral bands (RGB, NIR, SWIR), imaging modes (strip, spotlight, widearea), maximum off-nadir collection angles, and data downlink capabilities. For instance, when planning a collection requiring 50 cm resolution imagery of a coastal area, the platform queries the database to identify satellites that can achieve the required resolution while accounting for atmospheric conditions typical to coastal environments.

A dynamic tasking subsystem 130 processes the variety of inputs through optimization algorithms to generate a comprehensive data collection plan 160. This plan includes specific collection windows, sensor configurations, and orbital access points for each required collection. For example, if a collection requirement specifies morning imagery of an area prone to afternoon cloud cover, the system will prioritize satellites with favorable morning passes while considering factors such as sun angle and expected atmospheric conditions. Data collection plan 160 is then implemented through the data collection network 170, which interfaces with multiple satellite operators' tasking systems to schedule and execute collections according to the optimized plan.

Real-time feedback mechanisms are implemented through a live context data aggregator 180, which continuously processes sensor data 181 from various sources to maintain current situational awareness. This includes but is not limited to real-time weather updates, satellite telemetry data, and initial image quality assessments. For instance, if a satellite begins collecting imagery and detects unexpected cloud formation or degraded atmospheric conditions, this information is immediately processed by the aggregator. The system can then evaluate whether these conditions will impact collection quality and determine if adjustments are needed.

An opportunistic tasking subsystem 190 serves as an intelligent oversight mechanism, continuously analyzing collection performance and environmental conditions to identify opportunities for improved data collection. When the system detects suboptimal conditions or collection results, it can dynamically modify collection strategies in real-time. For example, if a planned collection using an optical satellite is compromised by unexpected cloud cover, the opportunistic tasking subsystem can rapidly identify and task an available SAR satellite capable of imaging through clouds. These modified collection tasks are redirected to an enhanced data collection network 191, which maintains access to additional or alternative satellite resources reserved for dynamic re-tasking scenarios. This adaptive approach ensures that collection opportunities are maximized while maintaining the quality standards specified in the original requirements.

The system maintains continuous data flow and feedback loops between components, enabling dynamic adjustment of collection strategies based on changing conditions and requirements. This architecture ensures optimal resource utilization while maintaining flexibility to adapt to varying collection scenarios and environmental conditions. The integration of real-time monitoring and adaptive planning capabilities enables the system to maximize collection success rates while minimizing resource waste.

Figure 2:
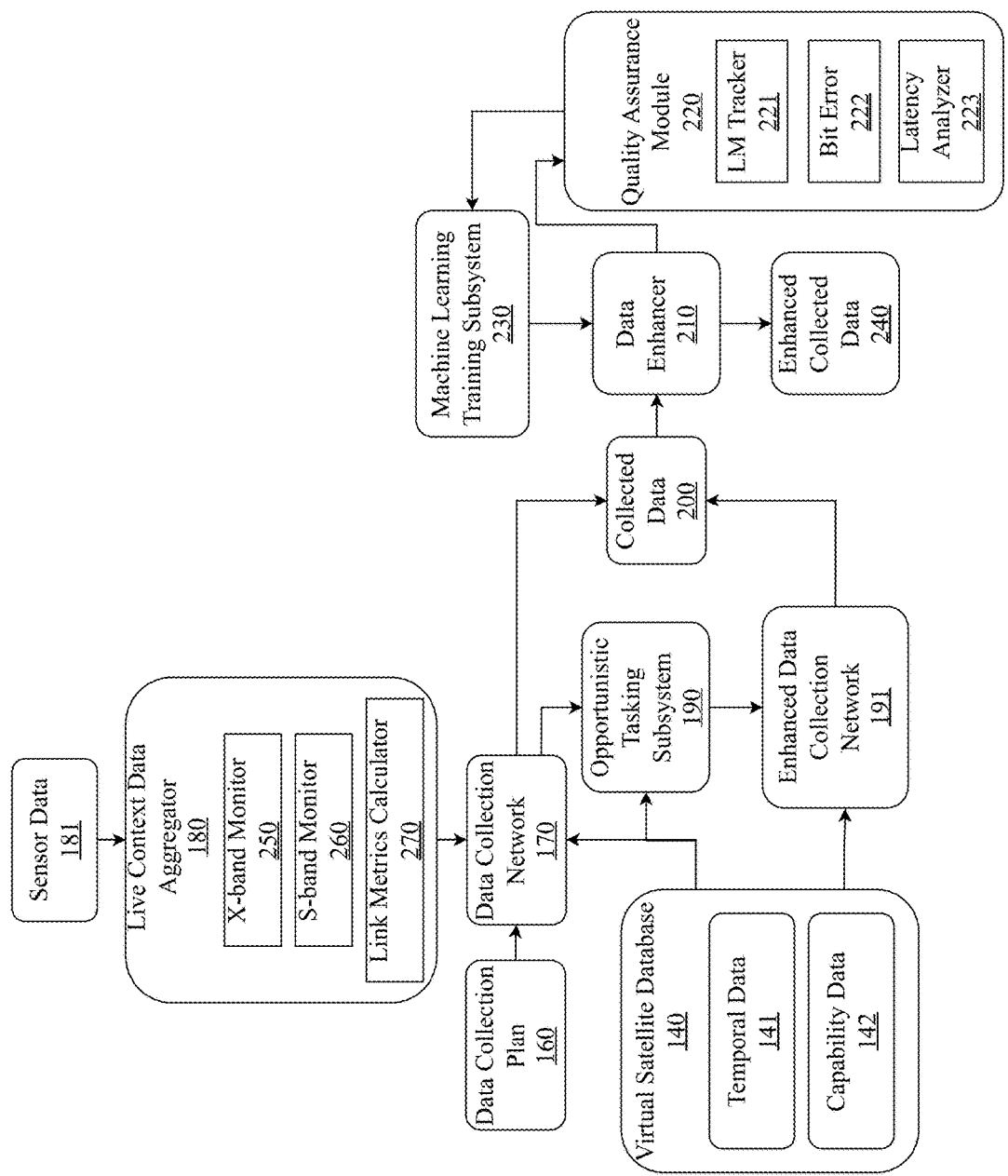
FIG. 2 is a block diagram illustrating an exemplary system architecture for an adaptive satellite data acquisition optimization platform with data quality assurance and quality reporting capabilities.

FIG. 2 is a block diagram illustrating an exemplary system architecture for an adaptive satellite data acquisition optimization platform with data quality assurance and quality reporting capabilities. The workflow begins with the execution of data collection plan 160 through data collection network 170, which coordinates satellite tasking and data reception. Live context data aggregator 180 continuously processes sensor data 181 to provide real-time feedback about collection conditions and initial data quality metrics.

The Live Context Data Aggregator 180 incorporates dedicated monitoring components for both X-band and S-band communications. The X-band monitor 250 tracks downlink quality performance in the 7.9-8.4 GHz range, while the S-band monitor 260 assesses uplink performance in the 2.2-2.3 GHz range. A Link Metrics Collector 270 continuously aggregates real-time performance data including signal strength, inference levels, and atmospheric impacts on both frequency bands.

The system employs parallel processing paths to maximize collection success and data quality. When the primary collection network identifies potential quality issues or collection constraints, the opportunistic tasking subsystem 190 can redirect collection tasks to an enhanced data collection network 191. This network leverages additional satellite resources identified through the virtual satellite database 140, which provides both temporal data 141 about satellite availability and capability data 142 regarding sensor specifications and operational parameters. For example, if initial collection attempts are compromised by environmental conditions, the system can automatically transition to satellites with more suitable capabilities for the current conditions.

Once data is successfully collected, it flows into the collected data repository 200, which serves as a secure staging area for incoming satellite imagery and associated metadata. This repository manages multiple data streams from various satellite platforms, each with their own format specifications and quality characteristics. The collected data may include multiple spectral bands, varying spatial resolutions, and different levels of atmospheric interference based on collection conditions.

A data enhancer 210 implements a sophisticated suite of enhancement algorithms tailored to address specific quality challenges in satellite imagery. For atmospheric correction, the system may analyze atmospheric conditions at the time of collection, including aerosol content, water vapor, and other atmospheric constituents to remove their effects from the imagery. Resolution enhancement employs advanced super-resolution techniques that can improve spatial detail while preserving spectral fidelity. Geometric accuracy improvements address issues such as terrain-induced distortions, satellite positioning errors, and perspective effects from off-nadir collections. In some embodiments, data enhancer 210 may utilize machine learning algorithms to improve the quality of collected data. Different algorithms may be necessary to address different data types.

A machine learning training subsystem 230 maintains a comprehensive database of enhancement scenarios and their outcomes, continuously learning from each enhancement operation. Building upon the target trajectory modeling techniques disclosed in U.S. Pat. No. 11,861,894 B1, when new data arrives, the system analyzes its characteristics—such as collection geometry, atmospheric conditions, sensor type, and target characteristics—and compares them against this historical database. For example, when processing imagery collected over urban areas during humid conditions, the system draws upon learned parameters from similar collections to optimize dehazing algorithms and contrast enhancement techniques.

The system's data ecosystem incorporates multiple specialized capabilities as shown in the architecture. Object-based production capabilities enable structured observations of targets, while Pattern of Life analysis provides deep behavioral understanding. AI/ML and Computer Vision processing occurs at both central and edge locations, enabling rapid exploitation of collected data. Persistent Surveillance integration, combined with Dynamic Exploitation capabilities and Over the Horizon Targeting, ensures comprehensive situational awareness. Precision Geolocation services provide accurate positioning data, while integration with the Fires Network enables tactical dissemination of processed intelligence. These capabilities work in concert with the Satellite data acquisition optimization platform collection orchestration system to ensure optimal data acquisition and exploitation.

The system has demonstrated operational performance through processing over 55,000 image collections across multiple vendors while meeting rigorous requirements for global facility coverage, monitoring cadence, accurate CV Recall and Precision performance, and precise geolocations for detected objects. The system leverages real-time local and space weather data from commercial forecast APIs along with constellation asset data including operational status, GSD, slew agility, competitive tasking overrides, tasking uplink. Cutoff windows, and downlink, backhaul, and production latency.

A quality assurance module 220 implements a multi-stage validation process for enhanced data products. Initial validation includes automated checks for geometric accuracy, radiometric calibration, and spatial resolution verification. Building upon the confidence interval calculations established in U.S. Pat. No. 11,861,894 B1, the module implements secondary validation examining enhancement-specific metrics, such as improvement in signal-to-noise ratio, reduction in atmospheric artifacts, and maintenance of spectral characteristics. The module also performs contextual validation, ensuring that enhancements have not introduced artificial features or unintended modifications to the imagery.

The system's data ecosystem has been proven to integrate with multiple specialized capabilities including state-of-the-art data science practices that leverage mass volumes of expertly curated data. Over the course of operational testing, CV model F1 Scores against target object schema have shown significant improvement, with up to 34% growth in specific object class performance.

The Quality Assurance Module 220 includes specialized components for communication quality monitoring. A Quality Assurance integration will be implemented through the Quality Assurance Module 220 with specific enhancements to support X-band and S-band communication metrics. This integration will provide comprehensive monitoring of communication quality while feeding performance data back to the Task Optimizer 412 and Dynamic Tasking Subsystem 130 for continuous optimization.

Link margin calculations integrate into the Live Context Data Aggregator 180, continuously monitoring and calculating margins for both X-band uplink and S-band downlink communications. These calculations incorporate atmospheric conditions from the Environmental Analyzer 512 and space weather impacts from the Space Data 151. The system maintains separate margin thresholds for high-priority communications (3.0 dB margin) for high-priority and (2.0 dB margin) for normal-priority communications, ensuring appropriate quality levels for different operational requirements.

Bit Error rate monitoring implements within the Data Collection Network 170, tracking error rates for both uplink commands and downlink data streams. The system enforces the maximum allowable error rate of $10^{-6}$, with real-time monitoring to detect any degradation in communication quality. This monitoring focuses particularly on weather impacted periods, using Earth Data 152 to correlate environmental conditions with communication performance.

Latency tracking operations through the Performance Monitor 513, measuring end-to-end communication delays across both X-band and S-band paths. The system tracks multiple latency components including ground station processing time, signal propagation delay, and satellite processing overhead. These measurements maintain the system's 4 hour latency requirement for data delivery.

The feedback loops between components include communication performance metrics. When the quality assurance module 220 identifies communication quality issues, it provides detailed metrics on link margins 221, bit error rates 222, and latency 223 to both data enhancer 210 and machine learning subsystem 230. This feedback enables dynamic optimization of communication parameters based on actual performance data. For instance, if certain atmospheric conditions consistently impact X-band or S-band performance during specific collection windows, this information is incorporated into future scheduling and resource allocation decisions.

Quality metrics feed back into the tasking optimization process through the Opportunistic Tasking Subsystem 190, enabling dynamic adjustments to communication schedules and resource allocation based on actual performance data. The Alternative Plan Generator 532 uses this quality data to develop contingency plans when performance metrics indicate potential communication challenges, ensuring continuous mission support under degraded conditions. All quality metrics and performance data store in the Model and Training Database 306, supporting long-term analysis and system optimization.

The system's quality assurance capabilities have been validated through extensive operational testing, achieving object detection Precision and Recall performance exceeding 90% F1/mAP50 across object classes. This performance is achieved through gold standard datasets that are meticulously labeled and strictly segregated from training data to ensure that each CV's model performance matches analytical capabilities of human experts. The system maintains an ever-growing library of 300,000+ gold-standard labels aligned to super and subcategories.

The final enhanced collected data 240 product represents imagery that has been optimized across multiple quality dimensions while maintaining data integrity. This might include imagery where cloud shadows have been corrected, haze has been removed, and resolution has been enhanced to better define feature boundaries. The enhancement process maintains careful documentation of all modifications, ensuring that downstream applications have access to both the enhanced imagery and a complete processing audit trail.

Figure 3:
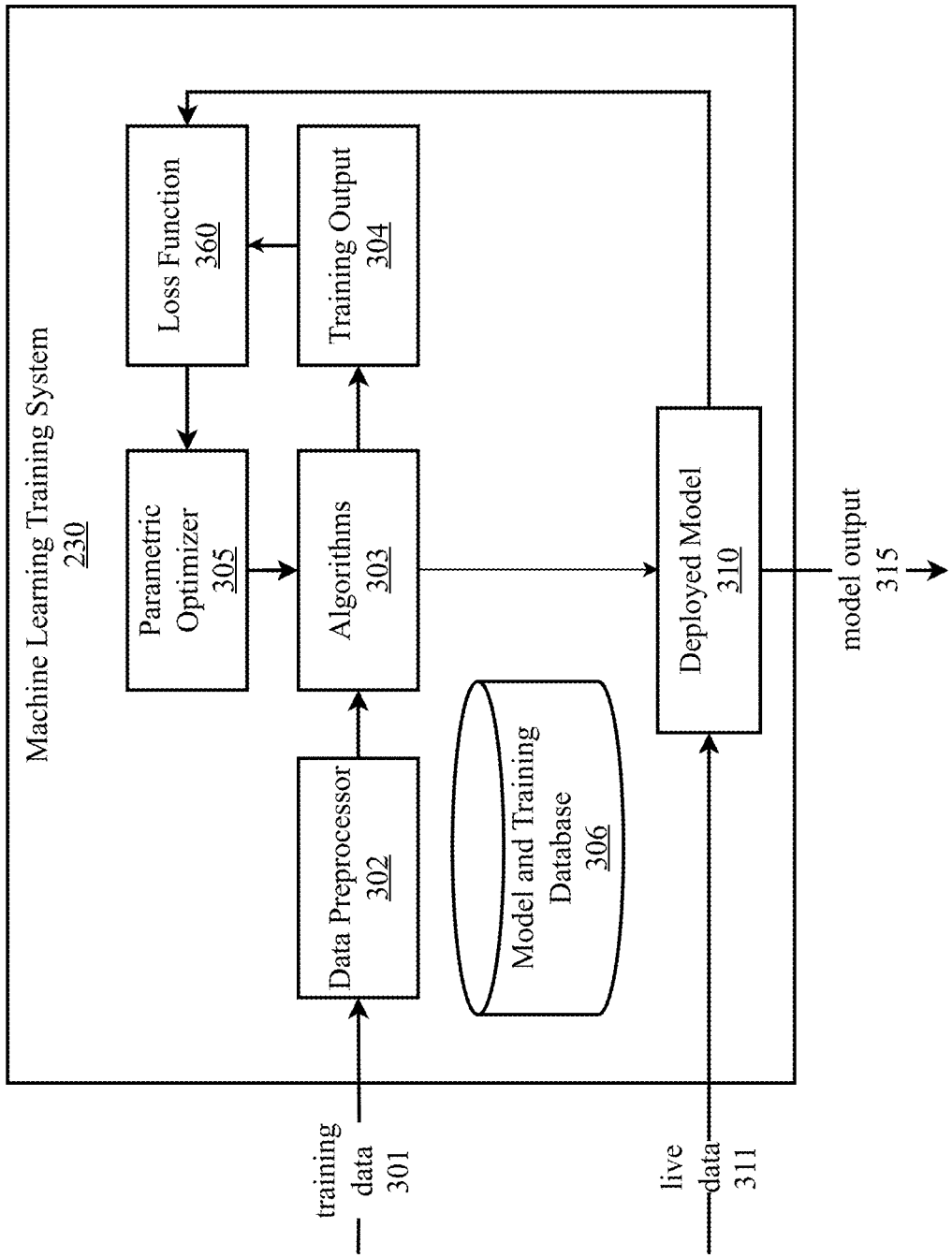
FIG. 3 is a block diagram illustrating an exemplary component of a system for an adaptive satellite data acquisition optimization platform with data quality assurance and quality reporting capabilities, a machine learning training subsystem.

FIG. 3 is a block diagram illustrating an exemplary component of a system for an adaptive satellite data acquisition optimization platform with data quality assurance and quality reporting capabilities, a machine learning training subsystem. According to the embodiment, the machine learning training subsystem 230 may comprise a model training stage comprising a data preprocessor 302, one or more machine and/or deep learning algorithms 303, training output 304, and a parametric optimizer 305, and a model deployment stage comprising a deployed and fully trained model 310 configured to perform tasks described herein such enhance the quality of gathered satellite data.

At the model training stage, a plurality of training data 301 may be received by the machine learning training subsystem 230. Data preprocessor 302 may receive the input data (e.g., satellite data, hyperspectral data, compressed data, images, videos) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 302 may also be configured to create training dataset, a validation dataset, and a test set from the plurality of input data 301. For example, a training dataset may comprise 80% of the preprocessed input data, the validation set 10%, and the test dataset may comprise the remaining 10% of the data. The preprocessed training dataset may be fed as input into one or more machine and/or deep learning algorithms 303 to train a predictive model for object monitoring and detection.

During model training, training output 304 is produced and used to measure the accuracy and usefulness of the predictive outputs. During this process a parametric optimizer 305 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning training subsystem 270 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, and personal identifying information/payment card industry redaction, to name a few. In one embodiment, the system may utilize a loss function 360 to measure the system's performance. The loss function 360 compares the training outputs with an expected output and determined how the algorithm needs to be changed in order to improve the quality of the model output. During the training stage, all outputs may be passed through the loss function 360 on a continuous loop until the algorithms 303 are in a position where they can effectively be incorporated into model output 315 generated by a deployed model 310.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 310 in a production environment making predictions based on live input data 311 (e.g., satellite data, hyperspectral data, compressed data, images, videos). Further, model correlations and restorations made by deployed model can be used as feedback and applied to model training in the training stage, wherein the model is continuously learning over time using both training data and live data and predictions. A model and training database 306 is present and configured to store training/test datasets and developed models. Database 306 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 303 may comprise a deep learning algorithm such as neural networks (e.g., recurrent, convolutional, long short-term memory networks, etc.). Extending the trajectory modeling capabilities disclosed in U.S. Pat. No. 11,861,894 B1, these networks are trained on both historical enhancement results and target custody data to optimize processing parameters based on specific collection conditions and data characteristics. In some implementations, the machine learning subsystem 230 automatically generates standardized model scorecards for each model produced to provide rapid insights into the model and training data, maintain model provenance, and track performance over time.

In some implementations, the machine learning training subsystem 230 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 306.

Figure 4:
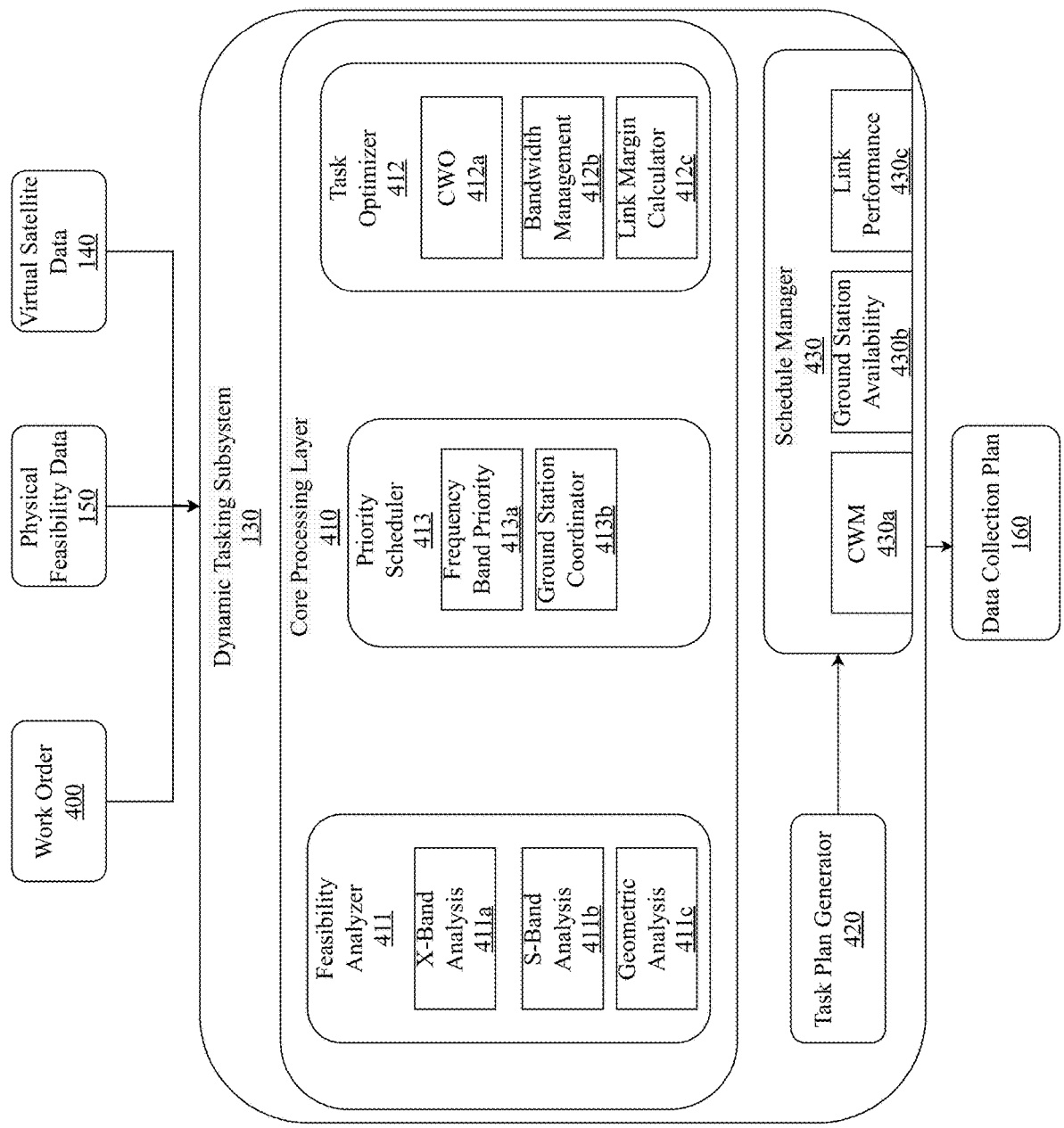
FIG. 4 is a block diagram illustrating an exemplary component of a system for an adaptive satellite data acquisition optimization platform with data quality assurance and quality reporting capabilities, a dynamic tasking subsystem.

FIG. 4 is a block diagram illustrating an exemplary component of a system for an adaptive satellite data acquisition optimization platform with data quality assurance and quality reporting capabilities, a dynamic tasking subsystem. Dynamic tasking subsystem receives work orders 400 containing specific collection requirements, physical feasibility data 150 providing environmental and operational constraints, and virtual satellite data 140 describing available collection resources. Core processing layer 410 represents the analytical core of the dynamic tasking subsystem, implementing algorithms to process multiple data streams and constraints simultaneously.

In one embodiment, a feasibility analyzer 411 processes the combined inputs through a multi-stage evaluation pipeline to determine viable collection options. In the first stage, it overlays orbital access windows from the virtual satellite data 140 with collection requirements to identify basic geometric compatibility. For example, when processing a requirement for 50 cm resolution imagery of a coastal area, feasibility analyzer 411 first identifies satellites capable of achieving this resolution, then calculates their viewing geometries and access times for the target location. In the second stage, feasibility analyzer 411 integrates physical feasibility data 150 to assess environmental impacts. This includes evaluating predicted cloud cover patterns, analyzing historical weather trends for the collection window, and calculating sun angles to ensure proper illumination. Feasibility analyzer 411 might determine that morning collections between 0900-1100 local time provide optimal illumination while avoiding typical afternoon cloud formation patterns.

In another embodiment, feasibility analyzer 411 may perform detailed geometric analysis, calculating factors such as target-to-sensor viewing angles and their impact on achievable resolution. For instance, if a satellite's nominal resolution is 50 cm at nadir (directly overhead), the analyzer calculates how this degrades at various viewing angles, perhaps determining that a 30-degree off-nadir angle would result in 65 cm resolution-potentially exceeding the requirement threshold. These calculations incorporate terrain effects, such as how mountain shadows might impact collection windows or how urban canyon effects could influence image quality at certain collection angles. Feasibility analyzer 411 aggregates these various constraints to generate a comprehensive feasibility score for each potential collection opportunity, considering factors such as predicted image quality, collection reliability, and compliance with requirement specifications.

The Feasibility Analyzer 411 incorporates dedicated communication analysis components for both uplink and downlink assessments. The X-Band Analyzer 411a evaluates downlink feasibility in the military X-band frequency range (7.9-8.4 GHZ), analyzing potential interference from solar activity, ionospheric disturbances, and terrain masking effects. For each potential collection opportunity, it calculates expected signal degradation from atmospheric and space weather conditions, producing a comprehensive uplink feasibility score. The S-Band Analyzer 411b component performs similar analysis for uplink communications in the 2.2-2.3 GHZ frequency range, with particular focus on atmospheric signal loss from cloud cover, precipitation, and other weather impacts. The Geographic Constraints Analyzer 411c evaluates terrain features and location specific restrictions that could impact either frequency band, incorporating data about terrain elevation, ground station visibility windows, and regional frequency use regulations.

For each viable collection opportunity, feasibility analyzer 411 generates detailed feasibility metrics that include confidence scores for various quality factors, predicted resolution at specific collection geometries, and potential risk factors that could impact collection success. These metrics might indicate, for example, that a morning collection at 15 degrees off-nadir would provide 55 cm resolution with 85% confidence of clear skies, while an afternoon collection at 25 degrees off-nadir would offer 60 cm resolution but only 60% confidence of clear conditions.

A task optimizer 412 builds upon the feasibility analyzer's 411 outputs by implementing an optimization framework to determine the most efficient collection strategies. When processing multiple collection opportunities, task optimizer 412 may employ a weighted scoring algorithm that considers both feasibility metrics and operational efficiency factors. For example, when optimizing collections across a geographic region, task optimizer 412 might identify that combining collections into a single satellite pass would reduce tasking overhead by 40% compared to separate collections, even if individual image quality might be slightly lower.

The Task Optimizer 412 includes specialized components for communication resource optimization. The Communication Window Optimizer (CWO) 412a analyses potential transmission windows for both X-band uplink and S-band downlink considering factors such as ground station visibility, atmospheric conditions, competing traffic demands. The Bandwidth Manager 412b allocates available bandwidth across the constellation, implementing dynamic adjustments based on mission priorities and real-time conditions. The Link Margin Calculator 412c continuously assesses expected link margins for both frequency bands, maintaining separate thresholds for high-priority communications (3.0 dB margin) and normal-priority communications (2.0 dB margin). These components work together to ensure optimal utilization of available communication resources while maintaining required quality of service levels.

The optimization process considers resource utilization patterns across multiple timescales. On a tactical level, it evaluates immediate collection opportunities, such as determining whether to collect imagery at a 20-degree off-nadir angle now versus waiting two days for a more direct overhead pass. Task optimizer 412 weighs factors such as predicted weather patterns, competing collection requirements, and the urgency of the collection requirement. For instance, if weather forecasts show deteriorating conditions over the next week, the optimizer might prioritize a less-than-ideal current collection opportunity over waiting for perfect conditions.

Priority Schedule 413 incorporates frequency band prioritization and ground station coordination capabilities. The frequency band prioritizer 413a manages competing demands for X-band and S-band resources, implementing a sophisticated ranking algorithm that considers factors such as mission criticality, weather impacts, and resource availability. The ground station coordinator 413b optimizes the allocation of ground station resources across multiple collection tasks, managing conflicts between uplink and downlink requirements while ensuring continuous coverage for critical operations.

A priority scheduler 413 implements a dynamic prioritization framework that manages multiple competing collection requirements. Priority scheduler 413 employs a multi-factor ranking algorithm that considers not just traditional priority levels, but also temporal dependencies, resource availability and windows. For example, when managing high-priority collections in regions with frequent cloud cover, the scheduler might temporarily elevate the priority of lower-priority tasks during clear weather windows to ensure efficient resource utilization.

Priority scheduler 413 may also implement conflict resolution mechanisms for competing collection requirements. When multiple high-priority collections vie for the same satellite resources, priority scheduler 413 may evaluate trade-offs and develops optimal scheduling solutions. For instance, if two collections require similar viewing geometries in nearby locations, the scheduler might bundle them into a single optimized collection sequence. Priority scheduler 413 may also maintain awareness of satellite tasking lead times and planning horizons, ensuring that high-priority collections are queued with sufficient advance notice to secure necessary resources.

Schedule Manager 430 includes dedicated components for communication and monitoring. The Communication Window Management 430a maintains real-time oversight of all planned communication windows, dynamically adjusting schedules based on changing conditions and requirements. The Ground Station Availability 430b tracks the current status and future availability of all ground stations, enabling efficient resource allocation and conflict resolution. The Link Performance Monitoring 430c provides continuous assessment of communication quality across both frequency bands, enabling rapid identification and response to any degradation in performance. These maintain close integration with the Containerized analytics workbench through the Live Context Data Aggregator 180, enabling comprehensive monitoring and management of all communication resources.

A task plan generator 420 transforms abstract collection requirements and optimization results into concrete, executable collection plans through a multi-stage process. For each optimized collection opportunity, task generator 420 creates detailed tasking parameters that specify exact collection geometries, sensor modes, and timing requirements. For example, when generating a plan for urban area imagery, the platform might specify a collection window of 1015-1025 local time, with the sensor operating in multispectral mode at 11-bit radiometric resolution, using a specific combination of spectral bands optimized for urban feature extraction.

Task generator 420 creates vendor-specific tasking instructions that account for different satellite operators' capabilities and requirements. These instructions may include specific orbital access points, sensor commanding sequences, and data handling requirements. For instance, when tasking a high-resolution optical satellite, the generator might specify a dynamic imaging sequence that adjusts exposure settings based on predicted surface reflectance variations, while for a SAR satellite, it might define specific beam modes and polarization combinations optimized for the target characteristics.

A schedule manager 430 serves as the tactical execution component, implementing sophisticated scheduling algorithms to coordinate multiple collection tasks across various satellite resources. The manager interfaces with specialized systems include the CURVE OE workbench for TECPED operations, Slingshot edge computing nodes for distributed processing, Full Motion Video (FMV) processing capabilities, and RF to GEOINT fusion services. Through these interfaces, Schedule manager 430 maintains a dynamic scheduling database that tracks all planned collections, their dependencies, and their temporal constraints, while coordinating with the broader partner community for comprehensive collection management. This integrated approach ensures efficient utilization of collection assets while maintaining the flexibility to respond to changing operational requirements.

The Communication Schedule Management system enhances Satellite data acquisition optimization platform's scheduling capabilities through integration with both the Schedule Manager 430 and Data Collection Network 170. This enhancement addresses uplink ad downlink communication requirements while maintaining coordination with the Containerized analytics workbench through the Live Context Data Aggregator 180. X-band uplink window management operates within Satellite data acquisition optimization platform's scheduling system, utilizing the Virtual Satellite Database 140 to track constellation communication windows. The system maintains dynamic scheduling of uplink opportunities based on orbital parameters 634 and coverage area limitations 635. These windows update continuously based on physical feasibility data 150, incorporating space and Earth conditions affecting X-band transmission quality in the 7.9-8.4 GHz range. S-band downlink management coordinates through the Enhanced Data Collection Network 191, tracking optimal downlink windows for each satellite within the 2.2-2.3 GHz frequency range. The scheduling system employs the Environmental Analyzer 512 to assess and predict viable downlink opportunities based on environmental conditions. Ground station coordination operates through the Data Collection Network 170, with the Satellite Tasking Manager 530 orchestrating multi-station communications. This includes real-time assessment of station availability, loading, and scheduling conflicts. The system optimizes station utilization by balancing uplink and downlink requirements while maintaining critical coverage.

Containerized analytics workbench integration occurs through the Live Context Data Aggregator 180, providing real-time communication monitoring. This enables immediate feedback on communication quality, link margins, and window utilization. The Performance Monitor 513 tracks effectiveness and enables dynamic schedule adjustments. Through the enhanced data collection network 191, the tasking manager maintains priority access to a subset of satellite resources specifically configured for rapid response scenarios. The network leverages multiple data collection modalities including SAR, EO, and RF sensors, while incorporating edge computing capabilities for real-time processing and exploitation. The system has successfully orchestrated over 55,000 individual collections and run CV inference on over 180,000 EO scenes, with the unique ability to process rapid Level-0 images which are typically available hours in advance of further vendor processing. These resources might include satellites with more flexible tasking protocols, better maneuverability, or specialized imaging capabilities. The network is managed through a dedicated tasking interface that enables expedited command sequences and priority data routing when implementing alternative collection plans. This comprehensive scheduling system operates within the Dynamic Tasking Subsystem 130, synchronizing communication schedules with overall mission execution. The approach provides flexible management of uplink and downlink communications while adapting to dynamic conditions and requirements.

When managing multiple collections in a geographic region, the schedule manager might identify that shifting a collection time by 15 minutes would enable more efficient use of satellite resources while still meeting all collection requirements. Schedule manager 430 also implements contingency management capabilities, maintaining alternative collection options for critical requirements. For example, if a primary collection is at risk due to developing weather conditions, the manager can automatically activate pre-planned backup collections using alternative satellites or different imaging modes. The manager continuously monitors scheduling conflicts and resource constraints, implementing real-time adjustments to maintain optimal collection efficiency.

The Schedule Manager's 430 automated capabilities have been validated through extensive operational testing, processing over 1,700 EO images weekly through integration with vendor Discovery APIs to calculate true physical and competitive feasibilities. The system continuously monitors and refines planned collections for each Look hundreds of times per hour by polling vendor APIs for order status and weather forecast APIs for cloud coverage, automatically rescheduling at-risk collections.

A resulting data collection plan 160 represents a comprehensive collection strategy that includes primary collection tasks, backup options, and detailed execution parameters. Each plan may include specific timing sequences, sensor configurations, data routing instructions, and quality verification requirements. For instance, a plan might specify that initial image quality checks must be completed within 5 minutes of collection to enable rapid activation of backup collections if necessary. These plans are continuously updated based on feedback from the collection network, ensuring that collection strategies remain optimized as conditions change.

Throughout this process, the system maintains dynamic awareness of changing conditions and requirements, allowing for real-time adjustments to collection strategies when necessary. For instance, if weather conditions deteriorate for a planned collection, the system can rapidly reprocess through the core layer to identify alternative approaches or collection assets.

Figure 5:
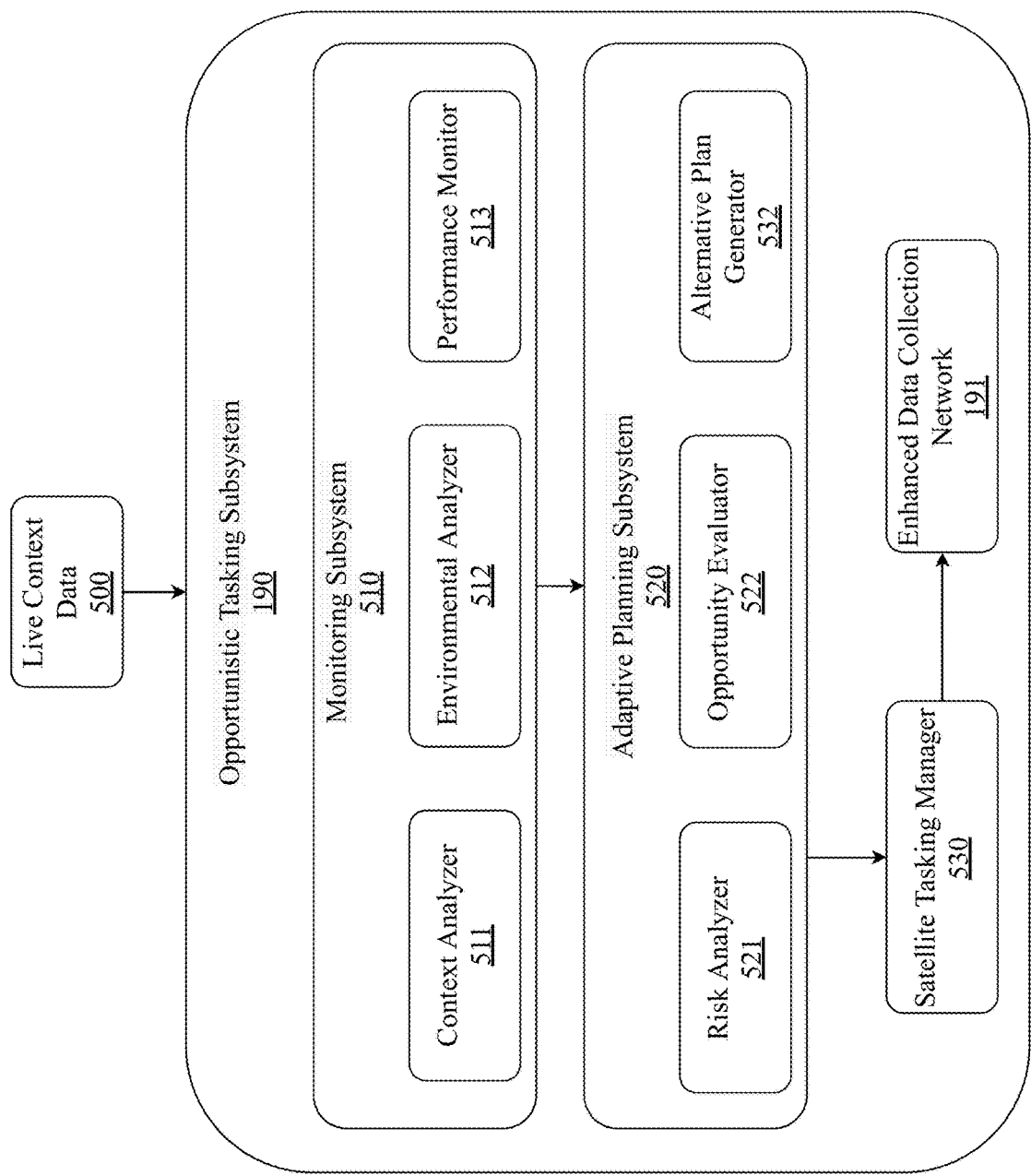
FIG. 5 is a block diagram illustrating an exemplary component of a system for an adaptive satellite data acquisition optimization platform with data quality assurance and quality reporting capabilities, an opportunistic tasking subsystem.

FIG. 5 is a block diagram illustrating an exemplary component of a system for an adaptive satellite data acquisition optimization platform with data quality assurance and quality reporting capabilities, an opportunistic tasking subsystem. The opportunistic tasking subsystem processes live context data 500 through multiple components to enable dynamic adaptation of collection strategies. The monitoring subsystem 510 serves as the first layer of analysis, implementing a plurality of monitoring components.

A context analyzer 511 processes real-time situational data to understand current collection conditions. For example, when monitoring an ongoing collection sequence, it might detect that a target area is experiencing unexpected urban development activity that could affect collection quality. An environmental analyzer 512 specifically focuses on environmental factors that could impact collection success. It processes real-time weather updates, atmospheric condition changes, and environmental phenomena that might affect collection quality. For instance, it might detect a developing dust storm that could degrade image quality several hours before it impacts the collection area. A performance monitor 513 evaluates the effectiveness of current collection strategies in real-time, tracking metrics such as image quality scores, collection success rates, and resource utilization efficiency.

In one embodiment, context analyzer 511 employs a multi-layered analysis framework to process real-time situational data. At its lowest level, it ingests raw sensor data from multiple sources, including but not limited to satellite telemetry, ground-based sensors, and external monitoring systems. This data undergoes initial preprocessing to normalize formats and temporal alignment before being fed into analysis modules. For instance, when analyzing urban areas, context analyzer 511 employs change detection algorithms that compare current imagery with historical baselines to identify significant changes. These algorithms can detect construction activities, temporary structures, or surface material changes that might affect reflectance characteristics and impact collection quality. Context analyzer 511 implements pattern recognition techniques to identify both gradual trends and sudden changes in collection conditions, using machine learning models trained on historical collection scenarios.

Environmental analyzer 512 maintains an integrated environmental modeling system that combines data from multiple weather services and atmospheric monitoring systems. It processes this data through a hierarchical analysis pipeline that evaluates conditions at different atmospheric levels and temporal scales. For example, when analyzing a planned collection area, it simultaneously evaluates ground-level conditions (such as fog or smoke), mid-level phenomena (cloud formations and precipitation), and upper-atmospheric effects (such as jet stream patterns and aerosol concentrations). Environmental analyzer 512 may employ predictive modeling techniques that can forecast how current conditions will evolve over various timeframes, from hours to days. These models account for diurnal patterns, seasonal trends, and local geographic influences on weather patterns. The system calculates specific impact metrics for different collection scenarios—for instance, determining that morning haze will reduce contrast ratios by 30% for visible spectrum collections but have minimal impact on SAR collections.

Performance monitor 513 implements a comprehensive metrics tracking system that evaluates collection performance across multiple dimensions. It maintains a real-time database of collection attempts, success rates, and quality metrics, processing this information through statistical analysis engines to identify trends and anomalies. Performance monitor 513 tracks both absolute performance metrics (such as achieved resolution and geometric accuracy) and relative metrics that compare actual results against predicted performance. For each collection, it generates detailed quality scores based on multiple parameters including signal-to-noise ratio, ground sample distance achieved versus planned, and geometric accuracy. These metrics are continuously updated and compared against historical performance baselines to identify degradation trends or systematic issues.

An adaptive planning subsystem 520 integrates monitoring outputs through a decision-making framework. A risk analyzer 521 implements a multi-factor risk assessment model that quantifies both immediate and potential future threats to collection success. It processes risk factors through a weighted scoring algorithm that considers both the probability and impact of various failure modes. For example, when evaluating a collection sequence over a coastal region, the analyzer might determine that morning fog presents a 70% probability of reducing image quality below requirements, while afternoon sea breeze patterns create a 40% probability of cumulus cloud formation. Each risk factor is assigned an impact score based on its effect on different collection parameters—for instance, calculating that light fog might degrade resolution by 20% while dense fog would prevent usable collection entirely.

An opportunity evaluator 522 maintains a dynamic opportunity scoring system that continuously assesses potential collection improvements. It implements a comparative analysis engine that evaluates current collection plans against potential alternatives across multiple parameters. For instance, when a new satellite becomes available, opportunity evaluator 522 calculates potential improvements in collection geometry, timing, and sensor capabilities compared to currently tasked assets. The evaluation process considers factors such as improved ground sample distance (e.g., 30 cm versus 50 cm resolution), better viewing angles (15 degrees off-nadir versus 25 degrees), or more favorable illumination conditions. Each opportunity is scored based on both its potential improvement over current plans and its probability of successful execution.

An alternative plan generator 532 employs a planning algorithm that develops multiple contingency options for each collection requirement. When risks or opportunities are identified, it generates detailed collection scenarios that account for satellite capabilities, orbital mechanics, and collection constraints. For example, if cloud cover threatens a primary collection, the generator might develop three alternative plans: one using a different imaging window with the same satellite, another using a different satellite with better viewing geometry, and a third employing SAR imaging to penetrate cloud cover. Each alternative plan includes specific timing sequences, sensor configurations, and data handling requirements optimized for the particular scenario.

A satellite tasking manager 530 implements a resource management system that maintains real-time control over satellite tasking and collection execution. It maintains a dynamic tasking database that tracks satellite availability, current tasking status, and response capabilities for rapid re-tasking. Satellite tasking manager 530 may employ a priority-based tasking protocol that can preempt lower-priority collections when necessary to exploit critical opportunities. For instance, if a high-priority collection is compromised by unexpected weather, the manager can immediately evaluate currently tasked satellites, identify those that could be re-tasked without significantly impacting their current missions, and implement the most efficient re-tasking solution. The manager also maintains awareness of satellite-specific constraints such as minimum re-tasking notice requirements, fuel status, and data downlink limitations, ensuring that adaptive tasking decisions remain within operational constraints.

Through the enhanced data collection network 191, the tasking manager maintains priority access to a subset of satellite resources specifically configured for rapid response scenarios. These resources are coordinated through the CURVE OE work bench for comprehensive TCPED operations, leveraging edge computing capabilities through Slingshot nodes for distributed processing. The network enables integration with FMV processing capabilities and specialized collection assets for Over the Horizon Targeting and Precision Geolocation services. This enhanced infrastructure supports both Object-Based Production and Dynamic Exploitation requirements while maintaining tactical dissemination paths through the Fires Network.

Figure 6:
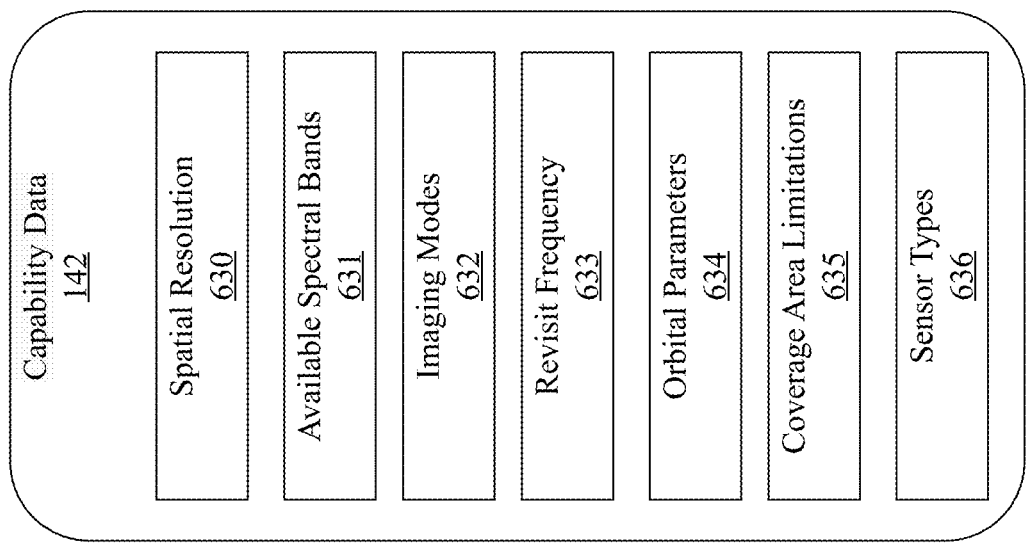
FIG. 6 is a block diagram illustrating an exemplary, non-exhaustive list of data sets for space data, Earth data, and capability data that may be incorporated into the system to enhance task allocation.
Figure 6:
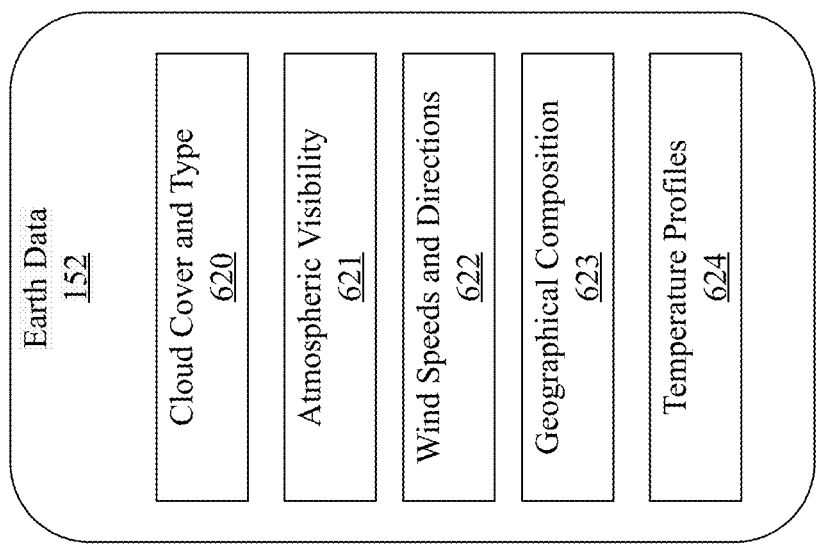
Figure 6:
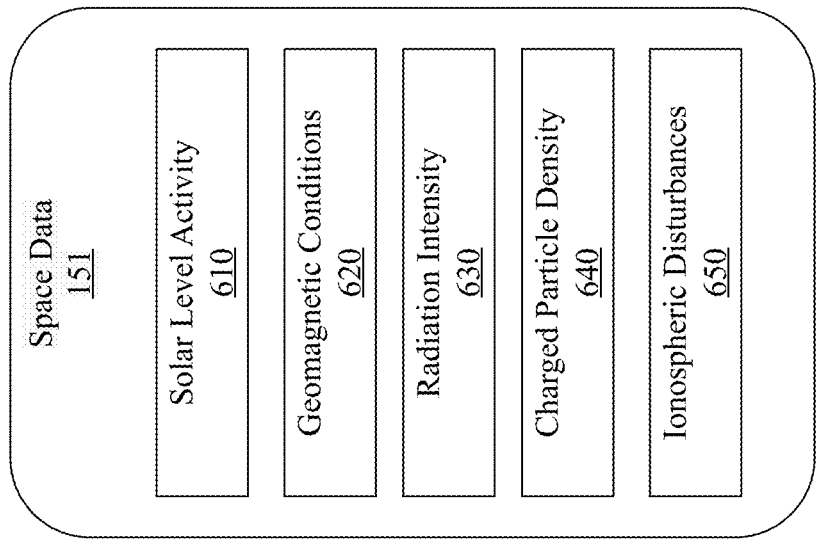

FIG. 6 is a block diagram illustrating an exemplary, non-exhaustive list of data sets for space data, Earth data, and capability data that may be incorporated into the system to enhance task allocation. The data categories and specific parameters illustrated in FIG. 6 represent exemplary types of information that may be utilized by the system, but should not be considered an exhaustive or limiting list of all possible data inputs. The dynamic nature of satellite operations, coupled with continuous advances in sensor technology and environmental monitoring capabilities, means that additional data types and parameters may be incorporated into the system's decision-making processes. For example, while the space data category lists several fundamental space weather parameters, the system may also process other space environment characteristics such as micrometeoroid activity, thermal conditions, or electromagnetic interference patterns. Similarly, the earth data category could expand to include additional atmospheric phenomena, seasonal patterns, or localized environmental effects that influence collection success. The capability data category may evolve to incorporate new sensor technologies, novel collection modes, or advanced platform capabilities as they become available. The system's architecture is specifically designed to accommodate and integrate new data sources and parameters as they become relevant to optimizing collection operations, ensuring that the platform remains adaptable to emerging requirements and capabilities.

The space data 151 category encompasses critical space environment parameters that can impact collection quality and satellite operations. Solar activity level 610 monitoring tracks solar flares, coronal mass ejections, and general solar output that can affect satellite operations and imaging quality. Geomagnetic conditions 620 include measurements of Earth's magnetic field variations that can impact satellite electronics and positioning accuracy. Radiation intensity 630 monitoring measures various forms of space-based radiation that can affect sensor performance and satellite operations. Charged particle density 640 tracking provides information about the concentration of energetic particles that can interfere with satellite electronics and imaging sensors. Ionospheric disturbances 650 monitoring tracks perturbations in the ionosphere that can affect signal propagation and data transmission.

The earth data 152 category includes atmospheric and surface conditions critical for collection planning. Cloud cover and type 620 analysis provides detailed information about cloud formations, density, and movement patterns that directly impact optical imaging capabilities. Atmospheric visibility 621 measurements track various atmospheric phenomena including haze, dust, and aerosol concentrations that affect image quality. Wind speeds and directions 622 at various altitudes influence both atmospheric conditions and potential platform stability. Geographical composition 623 data provides information about terrain types, surface materials, and features that affect collection geometry and image quality. Temperature profiles 624 through various atmospheric layers impact both sensor performance and atmospheric conditions affecting collection quality.

The capability data 142 category details the specific operational characteristics of available collection assets. Spatial resolution 630 specifications define the ground sample distance achievable under various collection conditions. Available spectral bands 631 describe the specific portions of the electromagnetic spectrum each sensor can collect, from visible light through various infrared bands to radar frequencies. Imaging modes 632 detail the various collection configurations available, such as strip mapping, spotlight, or wide-area collection capabilities. Revisit frequency 633 defines how often a satellite can image the same location based on orbital parameters. Orbital parameters 634 specify the satellite's orbit characteristics including altitude, inclination, and period. Coverage area limitations 635 define geographical and temporal constraints on collection capabilities. Sensor types 636 specify the fundamental collection technology employed, such as optical, synthetic aperture radar, or multispectral imaging systems.

Detailed Description of Exemplary Aspects

Figure 7:
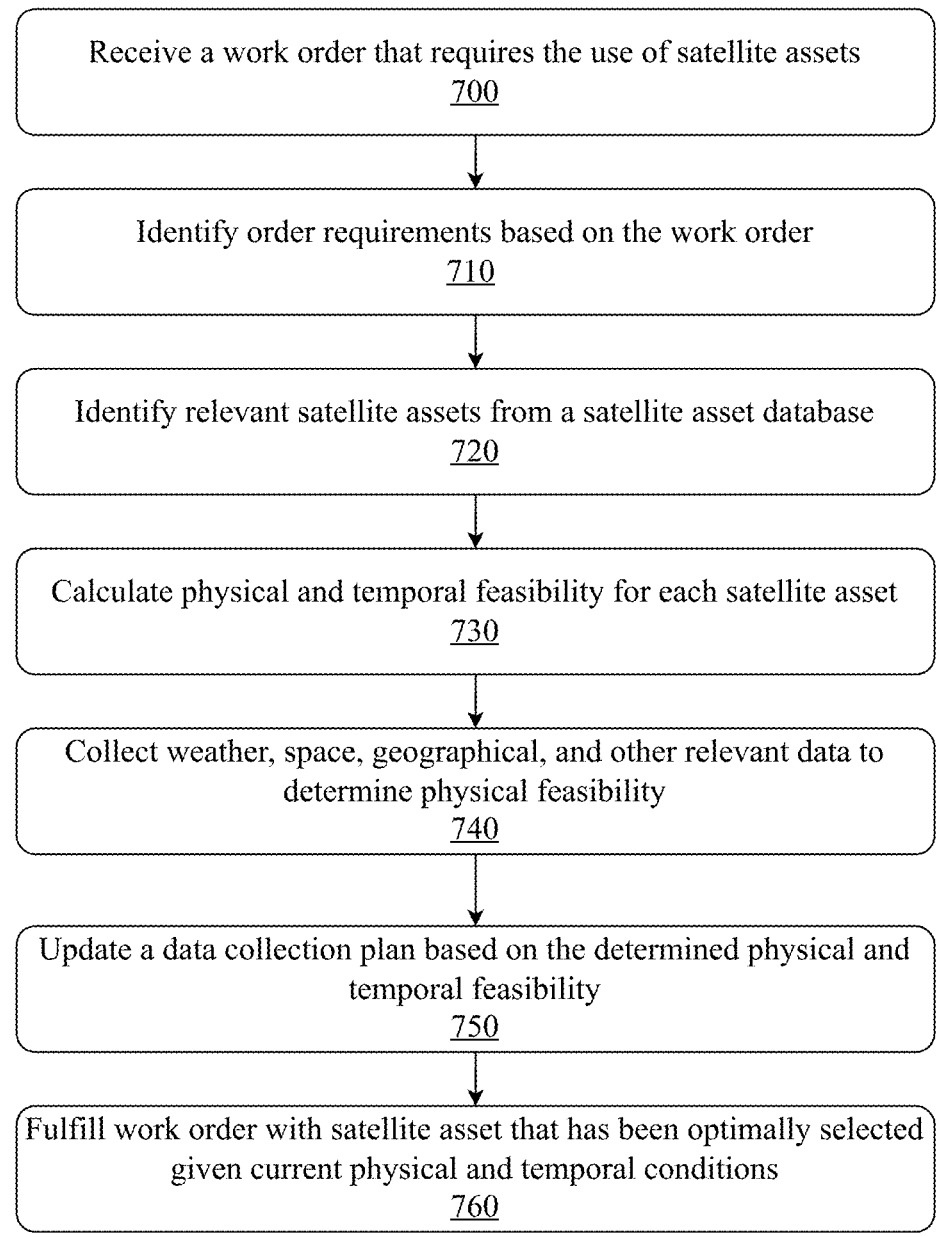
FIG. 7 is a flow diagram illustrating an exemplary method for an adaptive satellite data acquisition optimization platform.

FIG. 7 is a flow diagram illustrating an exemplary method for an adaptive satellite data acquisition optimization platform. In a first step 700, the system receives a work order that requires the use of satellite assets. This work order typically contains specific requirements such as ground sample distance, delivery timing, and collection parameters defined within a work order.

In a step 710, the system identifies specific order requirements based on the received work order. This step involves parsing and standardizing requirements such as persistence needs, latency constraints, and observation parameters into machine-readable formats that can be processed by the system's optimization algorithms.

In a step 720, the system identifies relevant satellite assets from a satellite asset database. This step involves querying the virtual constellation database to determine which satellites possess the necessary capabilities to fulfill the work order requirements, considering factors such as spatial resolution, spectral capabilities, and basic orbital parameters.

In a step 730, the system calculates physical and temporal feasibility for each identified satellite asset. This calculation considers factors such as orbital dynamics, collection geometry, and temporal constraints to determine which assets can physically accomplish the required collection within the specified timeframe.

In a step 740, the system collects weather, space, geographical, and other relevant data to determine physical feasibility. This step involves real-time queries to multiple weather service providers, analysis of terrain interference patterns, and evaluation of space weather conditions that might impact collection quality. The system processes both vendor-provided and third-party weather data to create comprehensive environmental awareness.

In a step 750, the system updates a data collection plan based on the determined physical and temporal feasibility. This step involves dynamically adjusting collection schedules and asset assignments based on the latest feasibility calculations, ensuring the plan remains optimized as conditions change. The system continuously monitors these conditions and updates the plan hundreds of times per hour when necessary.

In a step 760, the system fulfills the work order with a satellite asset that has been optimally selected given current physical and temporal conditions. This final step executes the optimized collection plan, tasking the selected satellite through vendor APIs and initiating the collection process. The selection considers all previously analyzed factors to ensure the highest probability of successful data collection.

Figure 8:
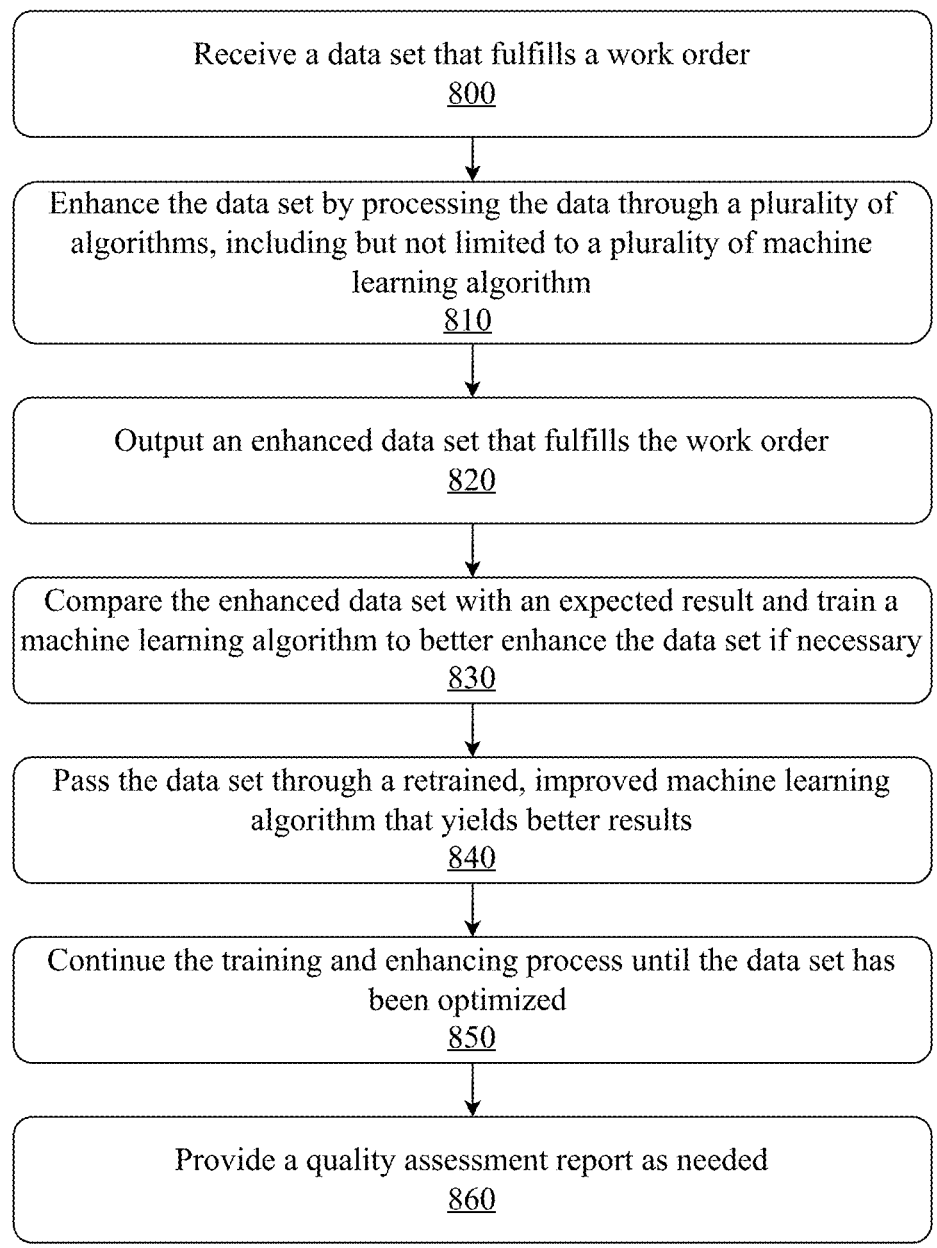
FIG. 8 is a flow diagram illustrating an exemplary method for an adaptive satellite data acquisition optimization platform with data quality assurance and quality reporting capabilities.

FIG. 8 is a flow diagram illustrating an exemplary method for an adaptive satellite data acquisition optimization platform with data quality assurance and quality reporting capabilities. In a first step 800, the system receives a data set that fulfills a work order, comprising the raw satellite imagery and associated metadata collected according to specified requirements. This initial data represents the unprocessed collection results that meet basic work order parameters.

In a step 810, the system enhances the data set by processing the data through a plurality of algorithms, including but not limited to machine learning algorithms. These algorithms apply sophisticated enhancement techniques that may include atmospheric correction, resolution improvement, and geometric accuracy refinement. The machine learning approach enables the system to learn from historical enhancement results and apply optimized processing parameters based on specific collection conditions and data characteristics.

In a step 820, the system outputs an enhanced data set that fulfills the work order requirements. This enhanced product represents the initial application of machine learning-based improvements to the raw collection data. The output undergoes detailed quality assessment to verify that enhancement objectives have been achieved.

In a step 830, the system performs a comparative analysis between the enhanced data set and expected results, using this analysis to train the machine learning algorithm for improved performance. This comparison evaluates multiple quality metrics including spatial resolution, radiometric accuracy, and feature definition. When necessary, the system adjusts the machine learning model's parameters based on identified discrepancies between achieved and expected results. In a step 840, the system processes the data set through the retrained, improved machine learning algorithm to achieve better enhancement results. This step applies the refined model parameters determined through the comparative analysis, potentially implementing multiple processing passes to achieve optimal results.

In a step 850, the system continues the iterative training and enhancement process until the data set has been optimized to meet or exceed quality requirements. This continuous improvement cycle may involve multiple iterations of enhancement and evaluation, with each pass refining the machine learning model's ability to improve data quality. In a step 860, the system generates a quality assessment report documenting the enhancement process and results. This report includes detailed metrics about improvements achieved, processing parameters used, and validation results from each enhancement iteration. The report provides transparency into the enhancement process and verification of the final data quality.

Figure 10:
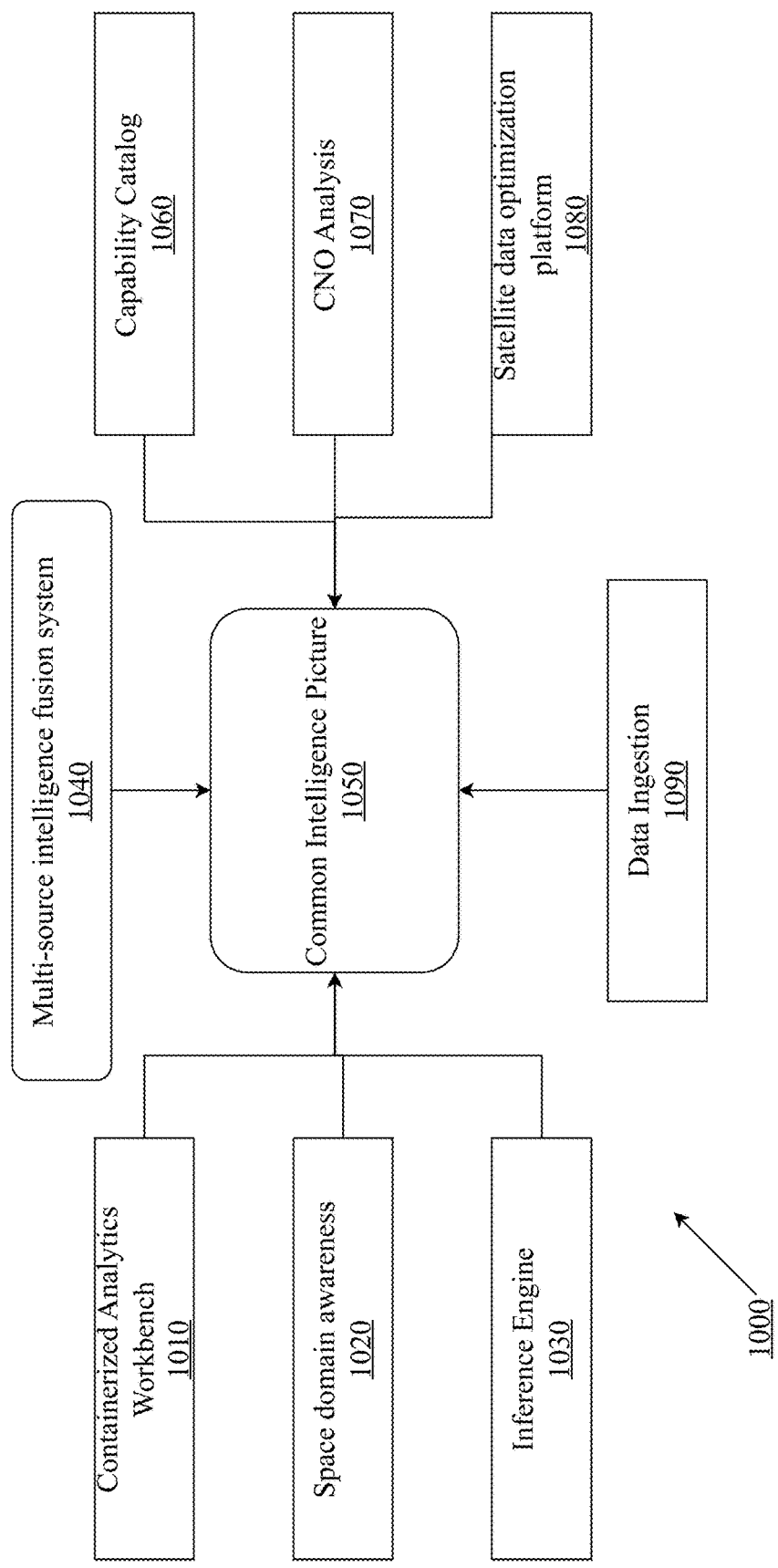
FIG. 10 illustrates a block diagram of the system architecture, depicting the multi-modal AI components that populate the common intelligence picture.

FIG. 10 illustrates the system modular architecture 1000 designed to populate the common intelligence picture 1050 through a distributed processing framework. Satellite data acquisition optimization platform 1080, which was disclosed in detail above, handles satellite tasking and orchestration through sophisticated algorithms to evaluate multiple real-time conditions including weather patterns, orbital dynamics, and sensor capabilities to determine the most effective collection opportunities. Through continuous monitoring and assessment of physical feasibility factors such as terrain interference and environmental conditions, alongside competitive feasibility considerations including orbit availability and targeting geometries, Satellite data acquisition optimization platform 1080 automatically orchestrates data collection tasks across available satellite resources to maximize collection success rates and operational efficiency. As previously disclosed, Satellite data acquisition optimization platform 1080 has demonstrated operational performance through processing over 55,000 image collections across multiple vendors while meeting rigorous requirements for global facility coverage. The system leverages real-time local and space weather data from commercial forecast APIs along with constellation asset data including operational status, GSD, slew agility, competitive tasking overrides, tasking uplink cutoff windows, and downlink, backhaul, and production latency. The Satellite data acquisition optimization platform 1080 system's proven capabilities in optimizing collection opportunities across multiple satellite providers serve a foundational component within the broader architecture.

Building upon satellite data acquisition optimization platform's collection management capabilities, the architecture implements a sophisticated multi-node system where specialized components communicate through a message-based infrastructure, with multi-source intelligence fusion system 1040 serving as the primary neural hub for PIR processing and course of action generation. The system employs distributed computing techniques to enable parallel processing of multiple intelligence streams while maintaining data synchronization across components.

Through this integrated architecture, the multi-source intelligence fusion system 1040 processes complex intelligence requirements and priority intelligence requirements (PIRs). For instance, when tasked with monitoring industrial activity, it automatically parses the requirement text, determines appropriate courses of action, and identifies relevant collection assets and data sources to generate a comprehensive collection strategy that might include periodic satellite imagery, RF monitoring, and social media analysis. When new information arrives from any source, the multi-source intelligence fusion system 1040 automatically updates the common intelligence picture with the latest analytical findings. The system implements automated workflows across six distinct phases-Planning and Direction: multi-source intelligence fusion system processes PIRs and generates courses of action; collection: satellite data acquisition optimization platform executes multi-source collection including satellite tasking; processing: containerized analytics workbench implements automated data processing; analysis and exploitation: deep learning models conduct automated analysis while maintaining the CIP; dissemination: system generates customized intelligence products; feedback: interactive mechanisms enable continuous CIP/COP updates based on user feedback. Throughout this process, space domain awareness system maintains continuous space situational awareness, while the containerized analytics workbench manages automated processing workflows and intelligence product generation.

The architecture implements a sophisticated multi-node system where specialized components communicate through a message-based infrastructure. The system employs distributed computing techniques to enable parallel processing of multiple intelligence streams while maintaining data synchronization across components. This architecture maps directly to the joint intelligence process cycle, with each component fulfilling specific roles in response to Priority Intelligence Requirements (PIRs): multi-source intelligence fusion system and analytics handle planning and direction (Phase 1) by processing PIRs to develop comprehensive collection strategies that integrate multiple intelligence disciplines; Satellite data acquisition optimization platform, automated target recognition (ATR), Ground systems, and the collection coordination system execute data collection (Phase 2) by orchestrating synchronized collection system execute data across multiple intelligence disciplines including human intelligence (HUMINT), imagery intelligence (IMINT), electronic intelligence (ELINT), signals intelligence (SIGINT), open-source intelligence (OSINT), and cyber intelligence (CYBER), all driven by PIR prioritization and urgency; the containerized analytics workbench manages processing (Phase 3) through its containerized analytics and workflow automation, with expedited processing paths for time-critical PIRs; Analytics conducts analysis and production (Phase 4) by establishing significance and identifying patterns while maintaining focus on PIR satisfaction; and reporting handles dissemination (Phase 5) by generating finished intelligence products tailored to decision-maker needs and PIR responses. The architecture maintains continuous evaluation and feedback loops, ensuring intelligence products remain responsive to evolving operational requirements, PIR updates, and decision-maker feedback.

The containerized analytics workbench 1010 implements containerized analytics modules and workflow automation through a microservices architecture, enabling analysts to create and deploy automated processing chains using a visual workflow builder. The space domain awareness system 1020 maintains real-time space domain awareness through a distributed sensor network, processing telemetry data, orbital parameters, and space weather integration indicators through specialized algorithms for conjunction analysis and collection forecasting. The inference engine 1030 utilizes GPU-accelerated deep learning models for automated target recognition, implementing a sophisticated MLOps pipeline that enables continuous model training and deployment while maintaining version control of both models and training data.

The multi-source intelligence fusion system 1040, processes complex intelligence requirements. For instance, when tasked with monitoring industrial activity, it automatically parses the requirement text, identifies relevant collection assets and data sources, and generates a comprehensive collection strategy that might include periodic satellite imagery, RF monitoring, and social media analysis. When new information arrives from any source, the multi-source intelligence fusion system 1040 automatically updates the common intelligence picture with the latest analytical findings.

The capability catalog 1060 manage microservices that can be rapidly deployed to handle new requirements—for example, quickly implementing a new ship detection algorithm across the system. The CNO analysis 1070 might detect unusual network traffic patterns at a port facility and automatically cross-reference this with satellite-observed physical activities and known threat actor tactics. The satellite data acquisition optimization platform 1080 orchestrates satellite collection planning—for instance, when monitoring a remote facility, it automatically schedules complementary collections across multiple satellite providers, using SAR capabilities during cloudy conditions and high-resolution imagery during clear weather.

The data ingest layer 1090 processes multiple intelligence feeds. For example, when tracking global supply chain activities, the system simultaneously ingests shipping manifests, customs declarations, satellite imagery, and social media discussions about specific facilities or companies. When monitoring technology proliferation, it might combine technical publications, commercial shipping data, and facility monitoring to identify patterns of interest. Inter-component communication enables sophisticated coordination.

The system maintains continuous real-time updates as new information arrive from the collection sources, automatically correlating findings across multiple intelligence disciplines to provide comprehensive situational awareness. For instance, when monitoring global proliferation activities, the system automatically integrates physical observations, network patterns, supply chain data, and open source information to develop a complete understanding of activities and trends. This automated fusion of multiple intelligence streams enables rapid identification of emerging patterns, anomalous activities, and potential threats while maintaining historical context and supporting predictive analysis. Through continuous evaluation and feedback mechanisms, the common intelligence picture provides decision-makers with timely, accurate, and actionable intelligence that adapts to evolving operational requirements and emerging collection opportunities. The system further implements comprehensive security protocols including data anonymization, access control enforcement, and automated privacy filtering to ensure sensitive information is properly protected throughout the intelligence cycle. Through automated classification management, the system carefully controls information access and sharing based on established security policies and need-to-know requirements. For instance, when monitoring global proliferation activities, the system automatically integrates physical observations, network patterns, supply chain data, and open-source information while enforcing privacy rules that protect personally identifiable information and sensitive operational details. This automated fusion of multiple intelligence streams enables rapid identification of emerging patterns, anomalous activities, and potential threats while maintaining historical context and supporting predictive analysis, all within a secure framework that safeguards privacy and sensitive data. Through continuous evaluation and feedback mechanisms, the common intelligence picture provides decision-makers with timely, accurate, and actionable intelligence that adapts to evolving operational requirements and emerging collection opportunities while ensuring robust protection of privacy and sensitive information throughout the intelligence process.

Figure 11:
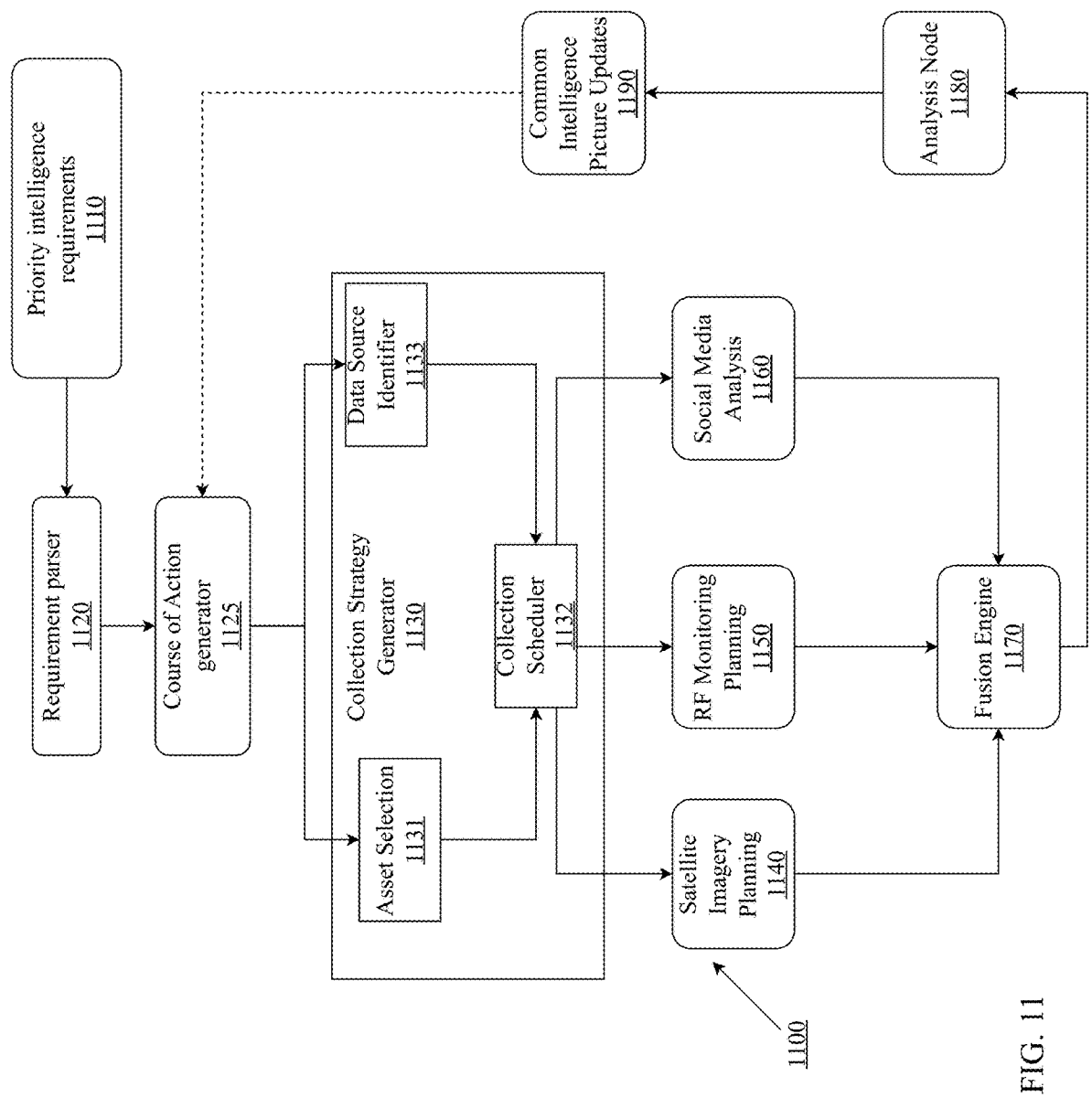
FIG. 11 illustrates a block diagram of the multi-source intelligence fusion system large language model, which functions as the neural processing hub within the architecture.

FIG. 11 is a subsystem 1100 illustrating the internal architecture of the multi-source intelligence fusion system 1040, which serves a neural processing hub within the architecture, implementing advanced large language model (LLM) capabilities for interactive intelligence requirement processing. The system provides sophisticated natural language processing to understand, analyze, and response to priority intelligence requirements (PIRs) through an interactive question-and-answer framework. When PIRs 1110 are received, the requirement parser 1120 module leverages natural language understanding to decompose requirements into structured components that drive downstream processing. For instance, when processing a requirement to monitor industrial activity at a port facility, the LLM-driven parser engages in interactive refinement of the requirement, breaking it down into specific parameters including facility boundary identification, vehicle movement detection thresholds, cargo handling equipment operational states, maritime vessel presence indicators, and associated storage facility status metrics. The parser's language model capabilities enable nuanced understanding of complex requirements while establishing priority indicators that influence subsequent processing decisions.

Following initial parsing, the system's LLM capabilities analyze requirements within the course of action generator 1125 through two parallel processing streams: asset selection 1131 and data source identification 1133. The asset selection module leverages the language model's understanding of capabilities and constraints to evaluate available collection platforms and sensors. The system automatically generates comprehensive courses of action that may include tasking the satellite data acquisition optimization platform, initiating OSINT collection, directing cyber operations, or coordinating other intelligence gathering activities. The data source identification stream employs natural language processing to determine relevant intelligence feeds needed for comprehensive analysis, incorporating diverse sources such as commercial shipping manifests, port authority schedules social media activity, local news reports, and environmental monitoring data.

The collection strategy generator 1130 subsystem, through its collection scheduler 1132, translates the LLM-generated courses of action into coordinated collection plans across three primary domains. These courses of action are automatically converted into specific tasking instructions for system components including the satellite data acquisition optimization platform and containerized analytics workbench. In the satellite imagery domain 1140, the scheduler coordinates dawn collections for shadow analysis of vertical structures, schedules SAR collections during predicted cloud cover, plans stereo collections for height determination, and optimizes multiple provider tasking for maximum temporal coverage. The RF monitoring domain 1150 involves scheduling SIGINT collection during peak activity periods, coordinating multiple sensor geometries for signal geolocation, adapting collection bandwidth based on signal characteristics, and implementing selective sampling strategies. Social media analysis 1160 planning encompasses targeting specific geographic regions and timeframes, monitoring identified user networks and activity patterns, tracking relevant hashtags and keywords, and analyzing image and video content from public posts. Throughout this process, results are continuously integrated into the Common Intelligence Picture while automated reporting workflows generate intelligence products based on the collected information.

The fusion engine 1170 represents a critical integration point where multi-source intelligence is aggregated through sophisticated processing algorithms. The engine performs temporal alignment of disparate data streams, spatial correlation of observations, cross-validation of indicators across sources, and confidence scoring of integrated assessments. For example, when satellite imagery reveals increased vehicle presence, the fusion engine automatically correlates this with RF emission patterns indicating enhanced communications, social media posts about increased work shifts, shipping manifest data showing scheduled deliveries, and historical patterns of similar activity to build a comprehensive understanding of the situation.

Within the analysis node 1180, advanced processing algorithms apply pattern recognition and change detection capabilities across the fused data streams. Pattern recognition encompasses activity level baseline deviation detection, seasonal trend analysis, anomaly identification, and correlation with known operational patterns. Then from the analysis Node, the common intelligence picture will update 1190. Change detection algorithms simultaneously monitor for infrastructure modifications, equipment deployment changes, activity pattern shifts, and personnel presence variations, providing a comprehensive analytical framework for understanding evolving situations.

The multi-source intelligence fusion system's courses of action are automatically translated into specific collection tasks for the satellite data acquisition optimization platform, establishing a sophisticated command and control relationship between the components. When the multi-source intelligence fusion system determines satellite collection is required, it automatically generates optimized collection parameters and communicates these directly to the satellite data acquisition optimization platform for execution. This processing occurs through synchronized workflows between the containerized analytics workbench and the broader architecture, continuously updating the Common Intelligence Picture (CIP) as new data is processed and analyzed.

The system implements automated report generation leveraging both the continuously updated CIP and the containerized analytics workbench's workflows. These reports are dynamically generated based on the original PIR requirements, incorporating newly collected intelligence, analysis results, and relevant historical context from the CIP. The reporting system automatically formats intelligence products appropriate to different user needs and security levels, while maintaining direct traceability to the originating PIR and collected intelligence within the CIP.

Figure 12:
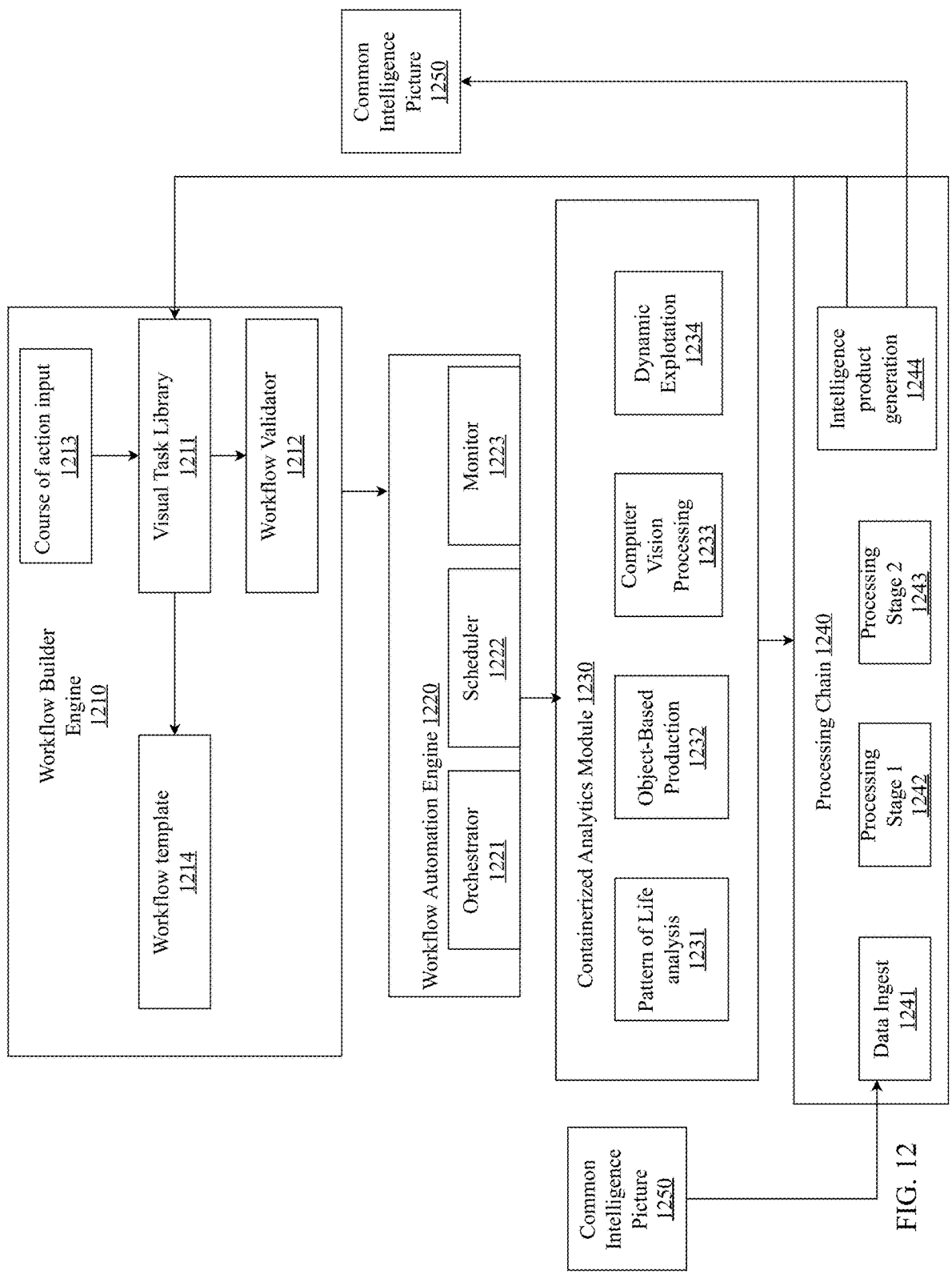
FIG. 12 illustrates a block diagram of the containerized analytics workbench component, which implements model-based analysis and containerized microservices within the architecture.

FIG. 12 illustrates the architecture of the containerized analytics workbench 1010, a critical component within the architecture that serves as the primary processing and analysis engine within Phase 3 of the Joint Intelligence process and intelligence lifecycle. The containerized analytics workbench utilizes advanced containerized analytics and workflow automation through a sophisticated microservices architecture to transform raw intelligence data into actionable insights. Through its modular design, the workbench enables rapid deployment of new capabilities while maintaining system stability and scalability.

The visual workflow builder engine 1210 represents the analyst interface layer, providing an intuitive graphical environment where intelligence analysts can design, modify, and deploy complex processing workflows without requiring deep technical expertise. The workflow builder engine 1210 implements sophisticated logic that translates analyst designed workflows into executable processing chains. For example, when analyzing patterns of life at a facility of interest, an analyst can quickly assemble a workflow that combines satellite imagery analysis, RF signal processing, and social media monitoring. The visual task library 1211 maintains pre-configured workflow templates designed to address common intelligence scenarios. These templates enable rapid workflow generation based on course of action requirements 1213—for instance, automatically assembling analytical components for maritime domain monitoring including vessel detection algorithms, wake analysis tools, and behavior characterization modules. When a new course of action is received, the system automatically selects and configures appropriate workflow templates 1214, which are then validated by the workflow validator 1212 to ensure they meet the original PIR requirements and course of action specifications.

The workflow automation engine 1220 serves as the operational core, orchestrating the execution of analytical workflows generated in response to the multi-source intelligence system directives. The orchestrator 1221 manages the complex flow of data and processing tasks, ensuring efficient resource utilization and maintaining processing priorities established by the original PIR. For example, when executing a multi-source analysis workflow, the orchestrator 1221 automatically might parallel process SAR imagery analysis alongside SIGINT data correlation while managing resource allocation to maintain system responsiveness. The scheduler 1222 coordinates the precise timing and sequencing of analytical operations based on course of action requirements. The monitor 1223 maintains continuous oversight of workflow execution, tracking processing status, resource utilization, and task completion while generating detailed performance metrics that feed back into the CIP.

The containerized analytics module 1230 implements the core processing capabilities through a scalable microservices architecture that responds to courses of action. The pattern of life analysis 1231 module employs algorithms to detect and characterize behavioral patterns across multiple intelligence sources as specified in the course of action. The object-based production module 1232 enables structured observation of targets through standardized collection and annotation frameworks, ensuring consistent analysis aligned with PIR requirements. The computer vision processing module 1233 leverages GPU-accelerated deep learning models for automated image analysis based on collection requirements specified in the course of action. The dynamic exploitation module 1234 enables rapid analysis of time-sensitive intelligence, automatically extracting and highlighting significant changes or activities that require immediate attention per the original PIR specifications.

The processing chain 1240 represents the practical implementation of workflows derived from courses of action, transforming raw intelligence data into finished analytical products that directly address PIR requirements. The data ingest 1241 stage implements data normalization and preparation functions, handling diverse input formats from multiple intelligence sources while maintaining data integrity and source attribution. The system supports multiple parallel processing stages 1242, 1243 that execute specific analytical tasks required by the course of action. The intelligence product generation stage 1244 automatically creates customized intelligence outputs based on the original PIR requirements and course of action specifications. When generating tactical intelligence summaries, the system automatically combines relevant imagery snippets, signal analysis results, and pattern matching assessments into cohesive reports. For ongoing surveillance requirements, the system produces pattern of life reports that merge temporal analysis, behavior characterization, and anomaly detection results, while comprehensive threat assessments incorporate multi-source correlation and historical trend analysis. The system also generates geospatial intelligence products with annotated imagery and derived feature analysis, alongside activity alerts containing associated collection artifacts and analytical findings. The intelligence product generation capability automatically formats all products according to preferences and roles, supporting multiple output formats including interactive displays, PDFs, and briefing materials. Each product maintains direct traceability to source data in the common intelligence picture (CIP) 1250 while enforcing appropriate security controls and access restrictions. The generation process implements automated quality checks throughout production to ensure completeness, accuracy, and alignment with original PIR requirements. Through continuous feedback loops, the system refines product generation based on interaction patterns, evolving requirements, and effectiveness metrics. When new intelligence data arrives, the system automatically updates relevant products while maintaining version control and change tracking. The product generation workflow adapts dynamically to changing priorities and needs, ensuring intelligence products remain current and responsive to operational requirements while maintaining the integrity of the analytical process. The processed results are properly formatted and delivered according to specific dissemination requirements established in the original PIR, automatically generating intelligence products that feed the CIP and support automated report generation.

Through standardized interfaces and API integration, the containerized analytics workbench maintains seamless connectivity with other components, facilitating rapid data exchange and coordinated processing across the broader intelligence architecture. This integration enables automated processing chains that support both persistent surveillance requirements and dynamic collection tasks, while the system's edge computing capabilities through slingshot nodes enable distributed processing close to collection sources. The architecture's modular design and containerized implementation ensure the system can rapidly adapt to new requirements and integrate emerging analytical capabilities while maintaining operational stability and processing efficiency.

Figure 13:
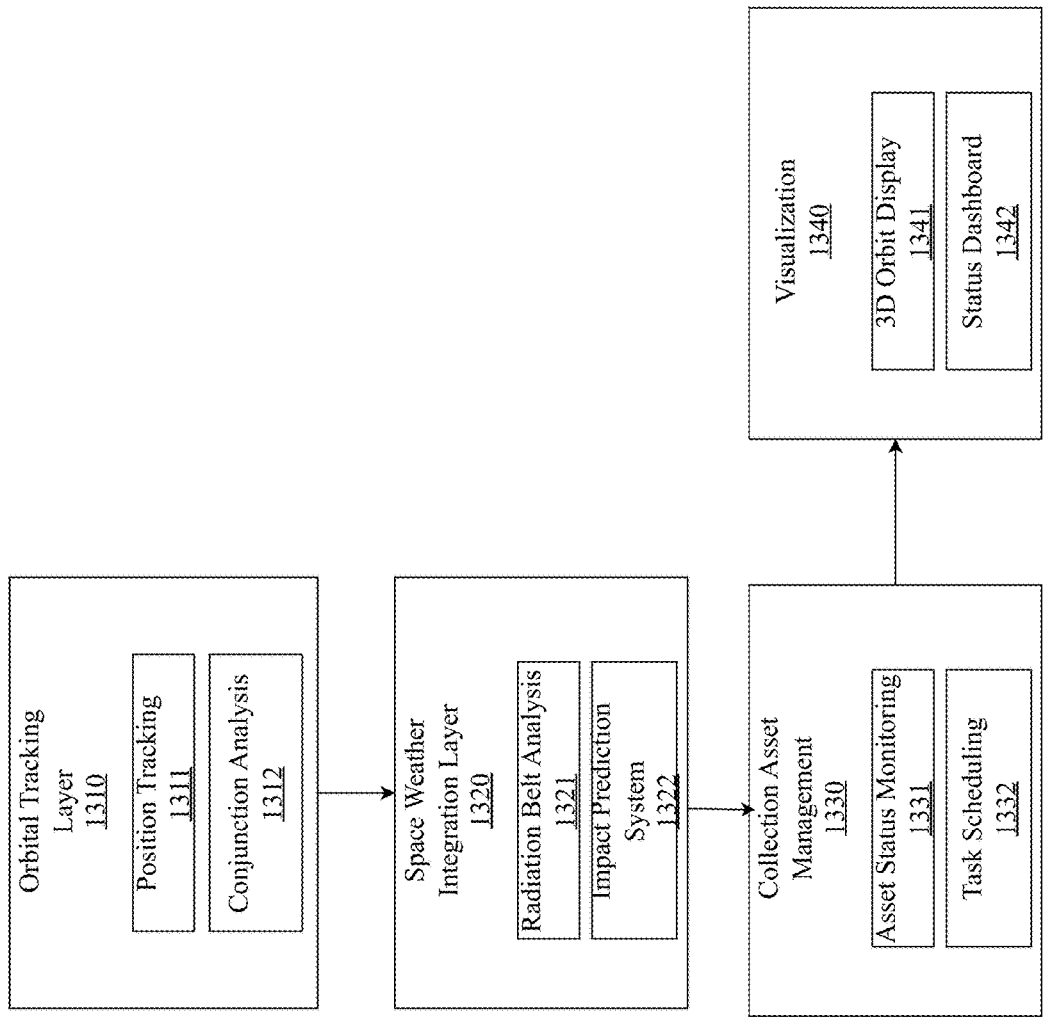
FIG. 13 illustrates a block diagram of the space domain awareness system architecture, which provides real-time collection asset management and space domain awareness through multiple integrated layers.

FIG. 13 illustrates the space domain awareness system architecture, designed to provide comprehensive space domain awareness and management of collection assets through four integrated layers. This hierarchical system implements sophisticated monitoring capabilities to ensure safe and efficient operation of orbital assets while enabling dynamic response to changing space conditions and mission requirements.

The orbital tracking layer 1310 establishes the foundational awareness of the space environment through two primary subsystems. Position tracking 1311 ingests and processes real-time orbital data for both collection assets and space objects of interest. For example, when tracking an imaging satellite in sun-synchronous orbit, the system continuously updates its position using two-line Element (TLE) data every 15 minutes, calculating future orbital positions up to 72 hours in advance with sub-kilometer accuracy. This enables precise prediction of collection opportunities, such as determining exact overhead passes for priority target areas. The conjunction analysis 1312 implements safety monitoring by evaluating potential collision risks between tracked objects. When monitoring a satellite preparing for an imaging pass, the system might detect a piece of orbital debris approaching within the designated 25-kilometer safety threshold, automatically calculating the probability of collision and time of closest approach. If the calculated risk exceeds 1 in 10,000, the system generates immediate alerts and begins developing alternative collection strategies.

The space weather integration layer 1320 provides critical environmental monitoring through two specialized components. The solar activity monitor within this system maintains continuous surveillance of solar conditions that could impact operations. For instance, when detecting a major solar flare (X-class), the system immediately evaluates potential impacts on satellite electronics and communications systems. If the flare is accompanied by a coronal mass ejection (CME), the system calculates its arrival time and predicted geomagnetic effects, such as increased drag on low-orbit satellites or potential communication disruptions. Radiation analysis 1321 tracks radiation conditions that could affect sensor performance. During periods of heightened solar activity, it might detect elevated radiation levels in the South Atlantic Anomaly region, automatically adjusting collection plans to minimize exposure of sensitive optical sensors during passes through this area. For example, if radiation levels exceed 100 rads/hour, the system could temporarily suspend high-resolution imaging operations to protect sensor equipment. The impact prediction system 1322 implements sophisticated forecasting and risk assessment capabilities to predict how space environment conditions will affect satellite operations and collection quality. The system processes multiple data streams to generate actionable predictions that enable proactive mission planning and risk mitigation. The impact prediction system enables sophisticated response to space weather events. When the solar activity monitor detects a major solar flare, the system immediately calculates arrival times for various effects, including radiation bursts, particle events, and communication impacts. These predictions trigger automated updates to collection schedules, communication plans, and orbital predictions while generating specific mitigation recommendations for operators. During predicted geomagnetic storms, the system provides comprehensive impact analysis including atmospheric density changes, orbital effects, collection quality predictions, and communication reliability forecasts. This integrated approach ensures optimal utilization of collection assets while maintaining system health and data quality standards, significantly improving operational efficiency and reducing environmental impact-related collection failures.

Collection asset management 1330 optimizes resource utilization through two sophisticated components. The Asset Status monitoring 1331 implements comprehensive health monitoring of satellite systems. For a typical imaging satellite, this includes tracking over 50 different parameters such as battery charge levels, solar panel efficiency, fuel reserves, and thermal conditions. If any parameter deviates from nominal ranges for instance, if battery charge drops below 85% during eclipse periods—the system generates alerts and adjusts collection plans accordingly. The task scheduling 1332 coordinates complex collection operations across multiple assets. When planning collections over a high-priority target area requiring persistent surveillance, the system might orchestrate complementary passes between optical and SAR satellites. For example, scheduling optical collections during clear daylight hours while automatically switching to SAR imaging during nighttime or cloudy conditions. The system also manages dynamic retasking, such as interrupting routine collections to respond to emergent high-priority requirements while minimizing impact on existing collection commitments.

The visualization layer 1340 enables efficient operator interaction through two integrated display systems. The orbit display 1341 provides interactive 3D visualization of the space environment, allowing operators to observe current satellite positions, predicted orbits, and planned collection opportunities. For example, when evaluating coverage of a new area of interest, operators can visualize all potential collection passes over the next 24 hours, including the expected ground track and sensor footprint for each pass. The status dashboard 1342 implements comprehensive situational awareness through configurable real-time displays. During normal operations, it might show key metrics like satellite health status, upcoming collection windows, and space weather conditions. When anomalies occur, such as a conjunction warning or solar storm alert, the dashboard automatically reconfigures to highlight critical information, displaying countdown timers to critical events and recommended mitigation actions.

The integrated operation of these layers enables sophisticated space domain awareness and efficient collection management. For example, during a typical collection scenario, the system might detect an approaching space weather disturbance through the space weather integration layer. This automatically triggers the collection management layer to adjust scheduled collections, shifting optical imaging operations to periods before the disturbance arrives while increasing utilization of SAR satellites during the affected period. The orbital tracking layer 1310 continuously updates asset positions and safety margins, while the visualization layer 1340 keeps operators informed of changing conditions and automated system responses. This coordinated operation ensures maximum collection efficiency while maintaining spacecraft safety and data quality.

Figure 14:
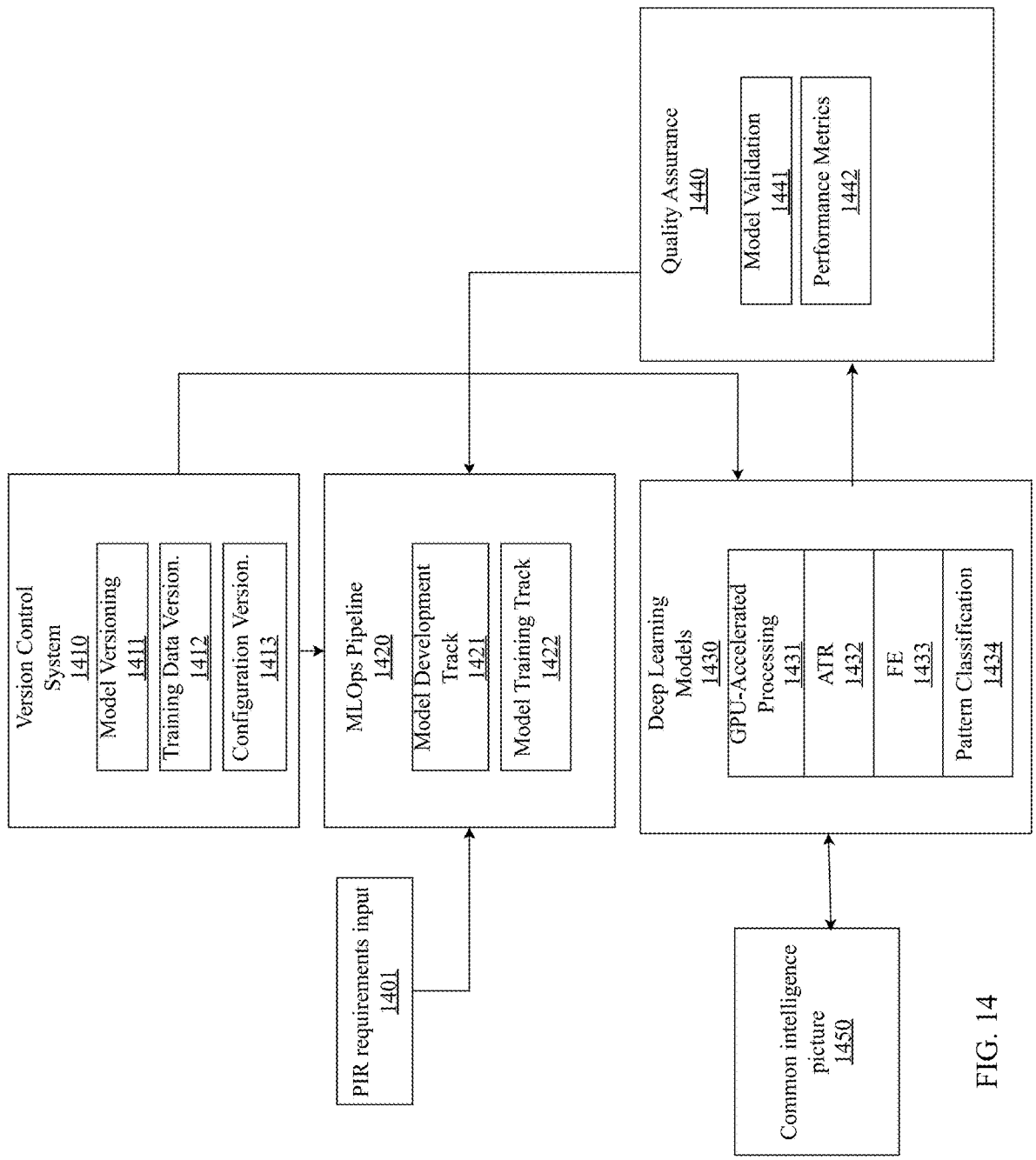
FIG. 14 illustrates a block diagram of the inference engine architecture, which implements GPU-accelerated deep learning models for automated target recognition within the framework.

FIG. 14 illustrates the architecture of the Inference Engine 1030, the inference Engine represents a sophisticated component within the architecture, implementing advanced GPU-accelerated inference capabilities for both deep learning models and processing multi-source intelligence fusion system directives. The system establishes a robust framework for executing complex analytical tasks derived from PIR-driven courses of action 1401 while maintaining strict version control and quality assurance standards throughout the operational lifecycle.

The MLOps Pipeline 1420 implements two integrated development tracks that enable continuous model evolution and improvement based on PIR processing requirements. The Model Development Track 1421 focuses on creating and refining deep learning architectures that directly support course of action execution. For example, when developing models for maritime vessel classification as specified by a multi-source intelligence fusion system directive, this track might combine convolutional neural networks for feature extraction with transformer architectures for contextual understanding of vessel behavior patterns. The model training track 1422 implements rigorous protocols for model training and optimization aligned with PIR requirements. When training models for facility monitoring based on specific courses of action, the system processes millions of images representing diverse operational conditions-varying illumination, weather conditions, seasonal changes, and partial obscuration scenarios. Advanced hyperparameter optimization techniques automatically tune model parameters using Bayesian optimization approaches, while sophisticated cross-validation procedures ensure model generalization across diverse operational scenarios.

The Deep Learning Models 1430 subsystem leverages state-of-the-art graphics processing unit (GPU) acceleration to enable real-time processing of intelligence data streams as directed by courses of action. The GPU-accelerated processing 1431 utilizes specialized hardware architectures to execute complex deep learning operations in parallel, achieving processing speeds up to 100 times faster than traditional CPU-based systems such as NVIDIA A100 GPUs, to execute complex deep learning operations in parallel, achieving processing speeds up to 100 times faster than traditional CPU-based systems. The automated target recognition (ATR) 1432 implements sophisticated computer vision algorithms that can simultaneously detect, classify, and track multiple objects of interest across diverse sensor modalities based on PIR specifications. For instance, when analyzing complex industrial facilities, the ATR system can identify specific equipment types with 95% accuracy, detect subtle changes in operational patterns, and automatically flag new construction or equipment installations. For automated target recognition, the system implements advanced computer vision algorithms that can simultaneously detect, classify, and track multiple objects of interest across diverse sensor modalities. For instance, when analyzing satellite imagery of industrial facilities, these algorithms can concurrently identify specific equipment types, characterize operational patterns, and detect changes in activity levels. The Feature Extraction 1433 component employs sophisticated algorithms to isolate relevant characteristics from raw intelligence data based on course of action requirements. The Pattern Classification 1434 applies trained models to categorize and identify complex patterns in processed data according to PIR specifications. When processing imagery of port facilities, the system can automatically classifies activities and objects according to the priorities established in the original course of action while maintaining real-time processing capabilities. Each update to the CIP 1450 maintains complete traceability to the generating model version and configuration, enabling transparent validation of results. The system implements sophisticated temporal management to ensure proper sequencing of updates while maintaining consistency across multiple simultaneous processing streams. Through this integration, the CIP provides continuously updated, comprehensive view of the intelligence picture that incorporates both historical context and real-time machine learning insights while maintaining analytical integrity and enabling rapid dissemination of critical findings to decision-makers.

The Version Control System 1410 maintains comprehensive tracking of all operational components to ensure reproducibility and systematic improvement. The Model Versioning 1411 implements sophisticated version control mechanisms that track all aspects of model development and deployment. For example, when updating a model for vehicle detection, the system maintains complete records of architecture changes, training configurations, and performance metrics, enabling rapid rollback if needed. The training data versioning 1412 tracks all modifications to training datasets, maintaining detailed documentation of data sources, preprocessing steps, and annotation procedures. This enables the system to reproduce training results and systematically improve model performance through targeted dataset enhancements. The configuration versioning 1413 manages comprehensive version control for all system parameters, including model hyperparameters, processing configurations, and deployment specifications. For instance, when deploying an updated facility monitoring model, the system maintains detailed records of all configuration changes, including neural network architecture parameters, training hyperparameters, inference optimization settings, and hardware-specific configurations. This enables systematic tracking of all system configurations while supporting rapid troubleshooting and performance optimization.

To ensure operational reliability, the quality assurance 1440 subsystem implements comprehensive validation protocols throughout the model lifecycle. The model validation 1441 conducts systematic performance testing using carefully curated validation datasets that represent real-world operational scenarios. For instance, when validating a new facility monitoring model, the system evaluates performance across different environmental conditions, viewing angles, and facility types. The performance metrics 1442 component tracks key indicators including detection precision, classification accuracy, and processing latency, maintaining detailed performance histories for each deployed model. These metrics enable continuous optimization of model performance while ensuring operational requirements are consistently met.

The system has demonstrated exceptional operational performance through rigorous testing and validation. Object detection capabilities consistently achieve precision and recall metrics exceeding 90% F1/mAP50 across diverse object classes, supported by an extensive library of over 300,000 meticulously labeled examples. This performance level is maintained through continuous model training and validation procedures that leverage carefully segregated training and testing datasets to ensure robust generalization capabilities. Through standardized API integration with other components, the inference engine enables sophisticated real-time processing of intelligence data while maintaining strict version control and quality assurance standards. For example, when processing incoming satellite imagery, the system automatically applies appropriate models for target detection while maintaining complete traceability of model versions and processing results. This integration enables continuous improvement of analytical capabilities while ensuring operational stability and processing efficiency across the broader architecture.

Figure 15:
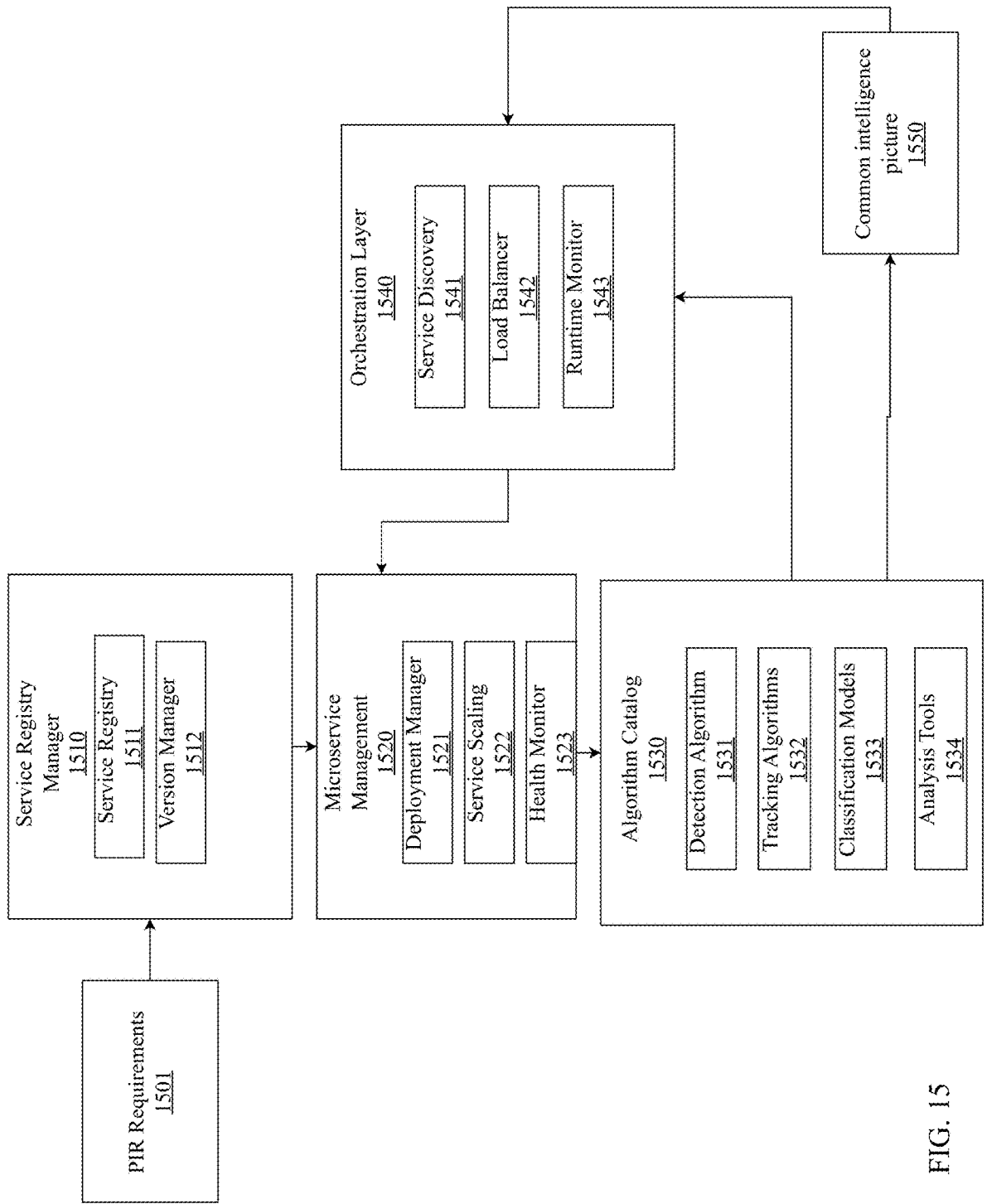
FIG. 15 illustrates a block diagram of the capability catalog architecture, which manages the rapid deployment and orchestration of analytical capabilities across the framework.

FIG. 15 illustrates the architecture of the capability catalog 1060 provides a sophisticated component within the architecture that serves as the dynamic management system for rapidly deploying and orchestrating analytical capabilities in response to courses of action generated by the multi-source intelligence fusion system. Through its advanced microservices architecture, the capability catalog enables seamless integration of analytical capabilities required to execute PIR-driven collection and analysis tasks 1501.

The service registry manager 1510 functions by implementing a comprehensive service management and control mechanisms aligned with course of action requirements. The service registry 1511 maintains a detailed inventory of all available services and their capabilities, tracking everything from basic satellite imagery analysis tools to sophisticated pattern recognition algorithms needed to fulfill PIR requirements. For example, when managing maritime domain awareness capabilities in response to a course of action, the registry maintains detailed records of ship detection algorithms, wake analysis tools, and behavior characterization services, including their specific capabilities, resource requirements, and operational parameters. When multi-source intelligence fusion system specifies particular analysis needs, the registry automatically identifies and catalogs required capabilities such as specific object detection algorithms, pattern recognition services, or correlation tools. The version manager 1512 implements rigorous control over service versioning, ensuring compatibility across deployments while maintaining detailed records of service evolution and dependencies required for consistent course of action execution.

The microservice management subsystem 1520 handles the complex operational aspects of deploying and maintaining analytical services required by courses of action. The deployment manager orchestrates the intricate process of service deployment, automatically handling resource allocation, configuration management, and integration testing based on PIR requirements. For example, when deploying a new synthetic aperture radar (SAR) processing capability, the deployment manager 1521 coordinates the distribution of processing components, establishes necessary data pathways, and verifies operational readiness across the system. The service scaling 1522 implements sophisticated algorithms for dynamic resource allocation, automatically adjusting processing capacity based on course of action priorities and operational demands. During periods of heightened collection activity, such as monitoring multiple high-priority targets simultaneously, the system can automatically scale up processing resources to maintain responsiveness while ensuring efficient resource utilization. The health monitor 1523 maintains continuous oversight of service performance and availability, ensuring reliable execution of PIR-driven workflows.

The algorithm catalog 1530 serves as a comprehensive repository of specialized processing capabilities required to execute various courses of action. The detection algorithms 1531 house a sophisticated suite of object recognition and pattern detection capabilities, ranging from basic feature detection to advanced deep learning models for complex target identification. For example, the catalog might include specialized algorithms for detecting and characterizing military equipment, analyzing construction activities, or identifying specific types of maritime vessels. The tracking algorithms 1532 provide advanced tools for monitoring and analyzing target behavior over time, enabling sophisticated pattern of life analysis and movement prediction. The classification models 1533 implement diverse categorization capabilities supporting automated labeling and categorization of detected objects and activities according to PIR specifications. The analysis tools 1534 provide specialized utilities for data processing and analysis, including capabilities for signal processing, image enhancement, and multi-source data fusion as required by specific courses of action.

The orchestration layer 1540 provides sophisticated operational coordination across the distributed processing environment. The service discovery 1541 implements advanced mechanisms for dynamically identifying and integrating available services, enabling automated service composition for complex analytical tasks. The load balancer 1542 employs sophisticated algorithms to optimize processing distribution across available resources, ensuring efficient utilization while maintaining system responsiveness. For instance, when processing multiple high-priority intelligence requirements simultaneously, the load balancer automatically adjusts resource allocation to maintain optimal processing efficiency. The runtime monitor 1543 maintains comprehensive oversight of system performance and resource utilization, generating detailed metrics and analytics to support continuous system optimization.

Through its integration with the broader architecture, the capability catalog 1512 enables rapid deployment of new analytical capabilities while maintaining strict operational standards. This is demonstrated through real-world examples such as the rapid deployment of new ship detection algorithms, where the system automatically handles service registration, deployment orchestration, resource allocation, and processing integration. The microservices architecture ensures both scalability and flexibility, allowing the system to efficiently adapt to evolving requirements while maintaining processing efficiency and operational stability. The system has demonstrated this capability through successful integration of numerous analytical services, supporting diverse intelligence requirements from basic object detection to sophisticated pattern analysis and threat assessment.

The integration between the capability catalog and common intelligence picture maintains continuous synchronization of analytical outputs and service states. As analytical services process intelligence data, the orchestration layer 1540 automatically manages the flow of results to the CIP 1550. The service discovery 1541 ensures all available analytical products are properly indexed and accessible, while the runtime monitor 1543 tracks the provenance of each analytical result to maintain complete traceability. For example, when detection algorithms 1531 identify objects of interest or tracking algorithms 1532 establish patterns of behavior, these findings are automatically formatted with appropriate metadata and confidence scores before being pushed to the CIP. Classification models 1533 enhance the CIP by automatically establishing relationships between detected entities, while analysis tools 1534 provide additional context through multi-source correlation. Each result maintains links to its generating algorithm version and configuration settings, enabling transparent validation of findings. The system implements sophisticated state management to ensure proper sequencing of updates while maintaining consistency across multiple concurrent analytical processes. This integration ensures the CIP provides a continuously updated, comprehensive view of the intelligence picture that incorporates outputs from all active analytical services while maintaining data integrity and enabling rapid access to critical findings.

Figure 16:
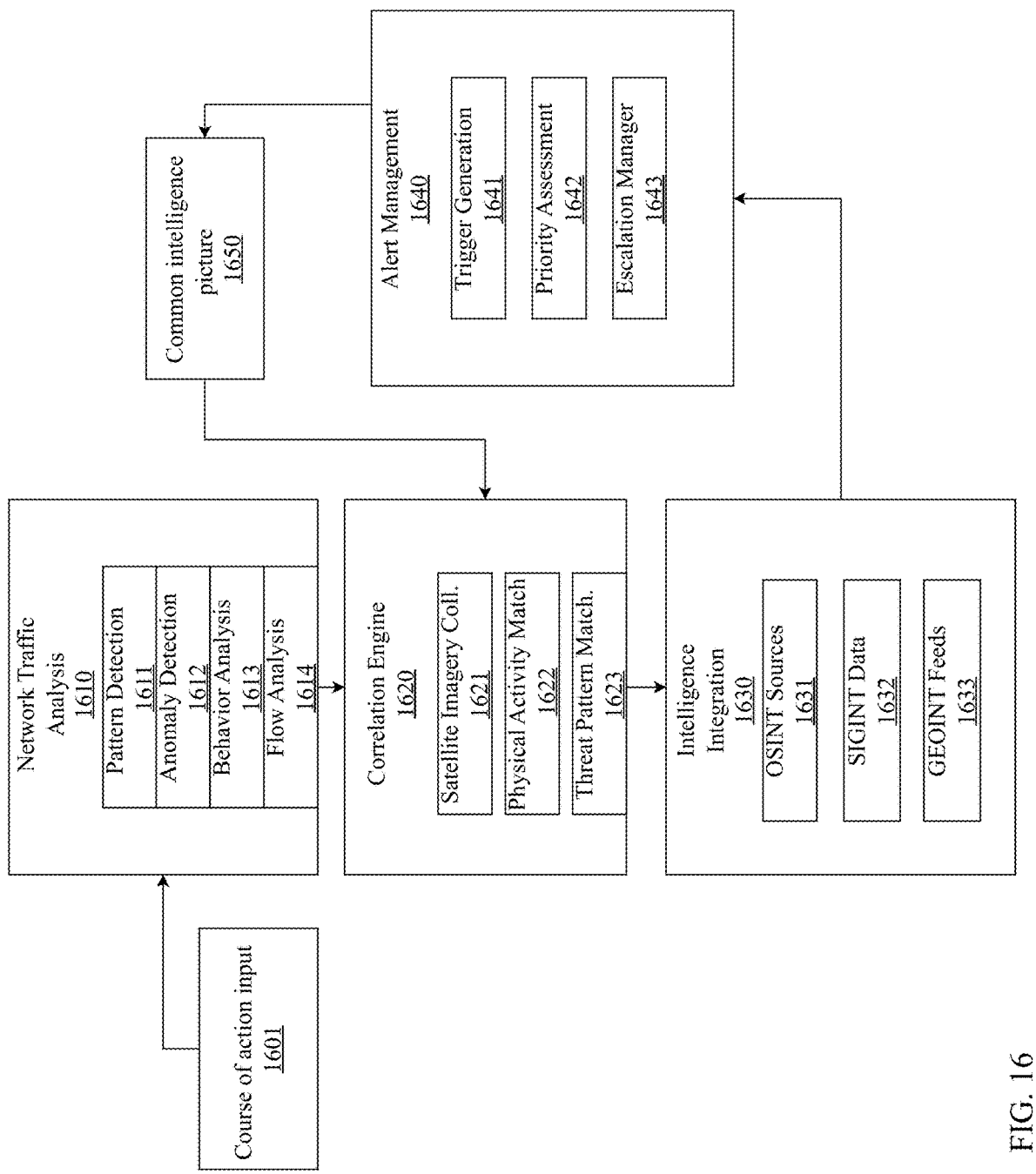
FIG. 16 illustrates a block diagram of the computer network operations (CNO) architecture, which integrates network traffic analysis with multi-source intelligence correlation capabilities.

FIG. 16 illustrates the architecture of the Computer Network Operations (CNO) Analysis component 1070, a sophisticated subsystem within the architecture that enriches threat detection and analysis by integrating advanced network traffic analysis with courses of action 1601 generated by the multi-source intelligence fusion system. This innovative system represents a critical advancement in cyber-physical intelligence fusion, enabling comprehensive monitoring and analysis based on PIR-driven requirements.

The Network Traffic Analysis 1610 subsystem forms the foundation of the CNO Analysis component, implementing state-of-the-art monitoring capabilities that process network data based on courses of action requirements. The pattern detection 1611 module employs sophisticated machine learning algorithms to identify recurring network behaviors and communication patterns specified in PIR requirements. For example, when monitoring a critical infrastructure facility based on a course of action, the system might automatically detect regular patterns of SCADA system communications. Anomaly Detection 1612 utilizes advanced statistical analysis and deep learning models to flag unusual network activities based on PIR-specified parameters. The behavioral analysis module 1613 implements long-term pattern recognition capabilities, studying network behavior over extended periods as directed by specific courses of action. For instance, it might track and analyze daily, weekly, and seasonal patterns in network traffic to establish detailed behavioral profiles. The flow analysis 1614 examines network traffic flows using visualization and analysis tools configured according to PIR requirements.

The correlation engine 1620 represents a groundbreaking approach to multi-source intelligence integration, implementing advanced algorithms for linking cyber activities with physical observations as specified in courses of action. The satellite imagery correlation 1621 module automatically connects network traffic patterns with observed physical changes based on collection requirements determined by the multi-source intelligence fusion system. The physical activity matcher 1622 employs sophisticated pattern matching algorithms to associate network behaviors with real-world events, such as linking spikes in industrial network traffic with observed changes in facility operations. The threat pattern matcher 1623 implements advanced comparison algorithms to evaluate observed patterns against an extensive database of known threat actor tactics, techniques, and procedures (TTPs), prioritized by current courses of action.

The intelligence integration subsystem 1630 serves as a sophisticated fusion center, synthesizing intelligence from diverse sources based on PIR requirements. The OSINT Sources 1631 module continuously monitors and processes open-source intelligence feeds according to parameters established in the course of action. The SIGINT Data module 1632 processes signals intelligence data as specified by collection requirements. The GEOINT Feeds module 1633 integrates geospatial intelligence data based on PIR-driven collection plans.

The Alert Management subsystem 1640 implements sophisticated response coordination mechanisms that ensure timely and appropriate handling of detected threats. The Trigger Generation module 1641 employs advanced decision algorithms to create alerts based on complex pattern analysis and correlation results. For example, when detecting a potential threat to a critical facility, the system automatically generates alerts that include both network indicators and correlated physical observations. The Priority Assessment 1642 utilizes machine learning models to evaluate alert severity and assign appropriate priority levels, considering factors such as target criticality, threat indicators, and historical patterns. The Escalation Manager 1643 implements automated workflows for alert handling and notification, ensuring that critical information reaches appropriate decision-makers in a timely manner. Through its deep integration with the broader architecture, the CNO Analysis component enables unprecedented capabilities in threat detection and analysis. The system demonstrates this through sophisticated pattern recognition and correlation capabilities, such as automatically linking suspicious network activities with observed physical changes at monitored facilities. Advanced machine learning algorithms and neural networks enable the system to identify subtle patterns in network behavior, detect emerging threat indicators, and even predict potential future activities based on observed patterns. The system maintains continuous adaptation to evolving threat patterns through automated learning mechanisms and regular updates to its threat detection models. For instance, when new threat actor TTPs are identified, the system automatically updates its pattern matching algorithms and correlation rules to maintain detection effectiveness. This comprehensive approach to cyber-physical intelligence analysis has demonstrated exceptional operational effectiveness. For example, during a recent deployment monitoring critical infrastructure facility, the system successfully identified and correlated subtle changes in network traffic patterns with minor physical modifications observed through satellite imagery, enabling early detection of potential security concerns. The system's ability to rapidly process and correlate vast amounts of data from multiple intelligence sources, while maintaining high accuracy in threat detection and low false positive rates, represents a significant advancement in integrated intelligence analysis capabilities.

Through continuous integration with the common intelligence picture (CIP) 1650, the CNO analysis maintains real-time correlation of cyber and physical intelligence indicators. The system automatically formats analytical findings with appropriate metadata and confidence scores before integration into the CIP. Each correlation maintains complete traceability to generating analysis components and course of action requirements. The system implements sophisticated temporal management to ensure proper sequencing of updates while maintaining consistency across multiple concurrent analysis streams. This integration enables the CIP to provide a comprehensive view that incorporates both cyber and physical domain intelligence while maintaining analytical integrity and enabling rapid dissemination of critical findings to decision-makers.

Figure 17:
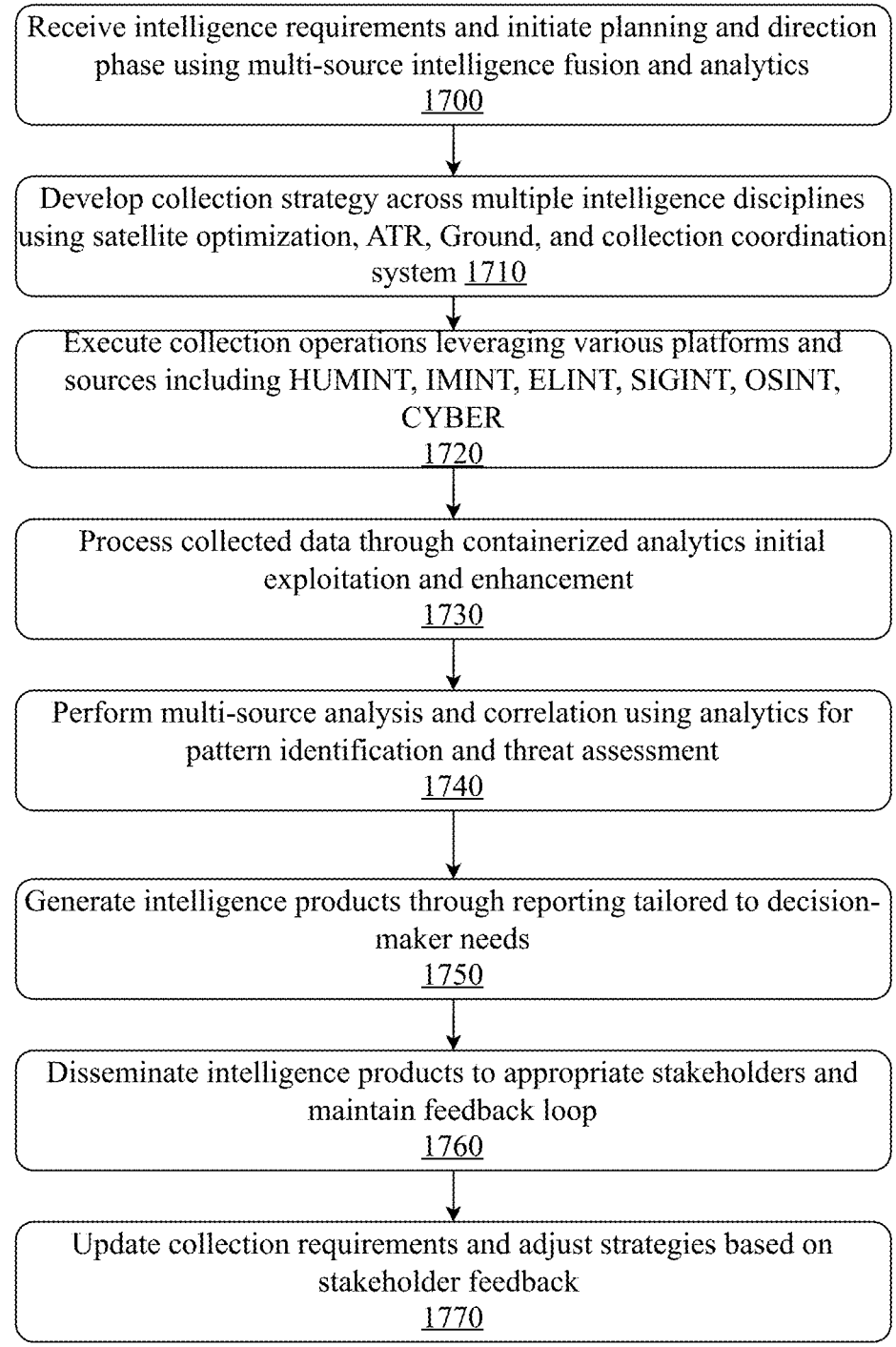
FIG. 17 illustrates a flow diagram of the comprehensive method for implementing the joint intelligence process through the system, demonstrating the integration of specialized components throughout each phase of the automated intelligence cycle.

FIG. 17 illustrates a comprehensive method for implementing the joint intelligence process through the system architecture, demonstrating how specialized components execute each phase of the automated intelligence cycle. At its core, the system is driven by the multi-source intelligence fusion system's large language model, which acts as an interactive question-and-answer system to process and respond to priority intelligence requirements (PIRs) with contextually appropriate courses of action. This integrated approach represents a significant advancement in automated intelligence operations, with each phase maintaining continuous updates to the Common Intelligence Picture. The process begins with Planning and Direction (phase 1), where the multi-source intelligence fusion system analyses incoming PIRs using sophisticated natural language processing to understand intelligence needs, temporal constraints, and operational context. This advanced LLM capability automatically generates comprehensive courses of action spanning multiple intelligence disciplines, ensuring limited collection assets are employed efficiently. These courses of action are continuously assessed and updated based on operational progress and emerging requirements. This has the overall responsibility for supervising and directing the resources that govern intelligence operations including support to PIR, ISR, and RFI management. Successful PIRs are tied to decision points, ensuring limited collection asserts are employed efficiently, and must be continuously assessed or updated depending on the progress of the operation. In Collection (phase 2), the satellite data acquisition optimization platform orchestrates multi-source collection in response to generated courses of action. The platform coordinates with the space domain awareness system for real-time collection asset management while evaluating physical feasibility across multiple providers. Collection integrates HUMINT (human intelligence), IMINT (imagery intelligence) through satellite platforms, ELINT (electronic intelligence), SIGINT (signals intelligence), OSINT (open source intelligence), and CYBER intelligence gathering, with each discipline carefully synchronized through the fusion engine to ensure complementary coverage. Once the collection plan has executed and the data arrives, it is processed for exploitation, the containerized analytics workbench manages processing (phase 3). During processing (phase 3), the containerized analytics workbench manages automated data preparation through its sophisticated microservices architecture. The workbench implements specialized processing chains for each intelligence type, leveraging GPU-accelerated deep learning models for automated target recognition while maintaining processing traceability to original PIR requirements. Stakeholders must consider available resources and capacity for the processing of raw information and then augment organic PED with federated reach back to ensure speed, depth of analysis, and support. The analysis and production stage (phase 4) utilizes analytics in concert with the inference engine's deep learning models to establish the significance of processed intelligence. The system automatically correlates findings across multiple intelligence sources, integrating disparate pieces of information to identify patterns while maintaining continuous updates to the CIP. This analysis establishes the significance and implications of processed intelligence, integrate it by combining disparate pieces of information to identify collateral information and patterns, then interprets the significance of any newly developed knowledge. A comprehensive Ops and intel overview with predictive analysis by analytics. Finished intelligence products take more forms depending on the needs of the decision-maker and reporting requirements. The level of urgency of various types of intelligence is typically established by an intelligence organization or community. The reporting handles dissemination (phase 5), which automatically generates intelligence products tailored to different user needs. The system supports multiple product formats including interactive displays, PDFs, and presentations, while maintaining direct links to underlying intelligence data in the CIP. The automated feedback mechanisms complete the cycle (phase 6) which enables users to provide input directly through or on derivative products, with feedback automatically processed to update the CIP ensuring intelligence products remain current and responsive to evolving requirements.

The intelligence cycle begins with the planning and direction phase, where the process begins with PIR intake and processing 1700 through the multi-source intelligence fusion system's LLM capabilities. The LLM acts as an interactive question-and-answer system that processes PIRs, understanding context, urgency, and specific intelligence needs. When receiving a complex requirement, such as monitoring industrial activity at a port facility, the system engages in natural language processing to analyze the PIR, automatically identifying key collection parameters including facility boundary identification, vehicle movement detection thresholds, cargo handling equipment operational states, maritime vessel presence indicators, and associated storage facility status metrics. The parser module works in concert with the capability catalog to identify required analytical services and algorithms, the space domain awareness system to evaluate collection asset availability and capabilities, and the containerized workbench to determine required processing workflows.

During this initial phase, the system's course of action generator processes priority intelligence requirements (PIRs) through two parallel streams where asset selection evaluates available collection platforms through the virtual satellite database and other collection resources, while data source identification determines relevant intelligence feeds needed for comprehensive analysis. The collection strategy generator then translates these requirements into coordinated plans across multiple domains, orchestrating satellite imagery planning for space-based collection, RF monitoring planning for signals intelligence, and social media analysis for OSINT collection. This sophisticated requirement analysis algorithms that automatically decompose complex intelligence needs into specific collection and processing tasks, considering available collection assets, temporal requirements, and operational constraints. When a requirement specifies monitoring of technology transfer activities, the system automatically develops a multi-INT collection strategy that might include daily high-resolution imagery collection during peak operating hours, continuous RF monitoring for specific communication signatures, and automated OSINT collection focused on relevant commercial shipping data and social media activity. This automated planning process ensures efficient resource utilization while maintaining focus on critical intelligence needs. The system's LLM capabilities enable nuanced understanding of complex requirements. For example, when a PIR specifies monitoring technology transfer activities, the system automatically analyzes the requirement to develop comprehensive courses of action spanning multiple intelligence disciplines. This might include orchestrating daily high-resolution imagery collection during peak operating hours, establishing continuous RF monitoring for specific communication signatures, and implementing automated OSINT collection focused on relevant commercial shipping data and social media activity. The system evaluates each potential collection strategy against historical performance data, current asset availability, and environmental conditions to optimize resource allocation. Through its natural language processing capabilities, the system maintains interactive refinement of requirements, automatically adjusting collection strategies based on emerging patterns and evolving operational needs. For instance, if initial collection reveals new indicators of interest, the system can autonomously modify its collection strategy while maintaining alignment with the original PIR intent. This automated planning process ensures efficient resource utilization while maintaining focus on critical intelligence needs, with each course of action maintaining clear traceability to originating requirements and organizational priorities.

Through integration with the fusion engine, the system maintains temporal alignment of collection strategies while the analysis node ensures analytical feasibility. For example, when a PIR specifies monitoring technology transfer activities, the system queries the satellite data acquisition optimization platform to evaluate collection opportunities, coordinates with the CNO Analysis component to establish cyber monitoring parameters, leverages the inference engine to configure appropriate deep learning models, and interfaces with the containerized analytics workbench to establish required processing chains. The system continuously evaluates collection strategies through the opportunistic tasking subsystem for dynamic collection adjustment, the live context data aggregator for real-time situational awareness, and the quality assurance module for performance validation. This integrated approach ensures comprehensive collection planning while maintaining clear traceability from PIRs through courses of action to specific collection tasks, with continuous updates to the Common Intelligence Picture throughout the process.

Following initial planning, the system develops detailed collection strategies based on the course of action 1710, where the satellite data acquisition optimization platform working under the direction of the multi-source intelligence fusion system's directives, automatically evaluates collection feasibility across multiple providers through the virtual satellite database, analyzing parameters such as orbital dynamics from the space domain awareness system, weather conditions from the live context data aggregator, and sensor capabilities cataloged in the capability database. This platform operates in synchronization with the inference engine's automated target recognition capabilities, which leverages GPU-accelerated deep learning models to process requirements and identify optimal collection parameters for object detection and classification tasks. The collection strategy generator coordinates these requirements across multiple intelligence domains through its collection scheduler, orchestrating comprehensive multi-INT operation. For satellite imagery collection, the system interfaces with the space domain awareness system's orbital tracking layer to identify optimal collection windows, such as morning passes between 0900-1100 local time that provide ideal illumination while avoiding typical afternoon cloud formations. Simultaneously, the system leverages the CNO analysis component for cyber collection, the containerized analytics workbench for signals intelligence processing, and the data ingest layer for OSINT aggregation, creating a synchronized collection strategy across all intelligence disciplines. The system maintains dynamic collection optimization through continuous feedback loops. The inference engine's Automated target recognition (ATR) system provides real-time assessment of collection quality and target detection confidence levels to the fusion engine, while the opportunistic tasking subsystem enables rapid adjustment of collection parameters. This information flows through the live context data aggregator to enable real-time mission refinement. The containerized analytics workbench coordinates these adjustments through its workflow automation engine, ensuring all collection assets maintain synchronization with evolving mission requirements. Through integration with the quality assurance module and performance monitoring systems, the platform continuously validates collection effectiveness while maintaining updates to the CIP, ensuring comprehensive intelligence gathering across all collection modalities. This step processes requirements from the multi-source intelligence fusion system LLM to identify optimal collection parameters for object detection and classification tasks.

For instance, when tasking satellite imagery collection, the system might identify that morning collections between 0900-1100 local time provide optimal illumination while avoiding typical afternoon cloud formation patterns. The system orchestrates comprehensive collection strategies across multiple intelligence disciplines. While the satellite data acquisition optimization platform manages space-based collection, the system simultaneously coordinates complementary collection assets—SIGINT collection during peak communication periods, implementing targeted OSINT monitoring of shipping manifests and port schedules, and establishing automated tracking of relevant cyber indicators. The ATR system provides continuous feedback on collection quality and target detection confidence levels, enabling dynamic adjustment of collection parameters to optimize recognition performance. The system automatically schedules these collection operations while optimizing resource allocation across available assets and coordinating multi-INT collection activities to ensure comprehensive intelligence gathering.

Then the execution 1720 implements these collection plans across multiple intelligence disciplines, representing a sophisticated orchestration of diverse collection capabilities. The satellite data acquisition optimization platform manages IMINT collection by interfacing with the space domain awareness system's asset management layer, which continuously monitors satellite health and capabilities while the orbital tracking layer ensures precise collection timing. For SIGINT and ELINT collection, the containerized analytics workbench deploys specialized processing chains through its workflow automation engine, while the CNO Analysis component's network traffic analysis subsystem handles CYBER intelligence gathering. The data ingest layer processes OSINT feeds through automated collection templates managed by the capability catalog's algorithm repository. This multi-INT synchronization is coordinated through the fusion engine, which maintains temporal alignment across all collection disciplines. For example, when monitoring technology transfer activities, the multi-source intelligence fusion system translates courses of action into synchronized collection tasks: the satellite data acquisition optimization platform schedules high-resolution imagery collection during predicted equipment movement windows identified through pattern of life analysis, while the CNO Analysis component's correlation engine links cyber activities with physical observations. The containerized analytics workbench simultaneously processes SIGINT data through its dynamic exploitation module, as the data ingest layer aggregates OSINT from shipping manifests and corporate registries through automated monitoring templates. The system manages simultaneous collection operations including HUMINT (human intelligence), IMINT (imagery intelligence) through satellite and aerial platforms, ELINT (electronic intelligence), SIGINT (signals intelligence), OSINT (open source intelligence), and CYBER intelligence collection. Each collection discipline is carefully coordinated to ensure maximum effectiveness and complementary coverage. For example, when monitoring a specific target involving technology transfer activities, the system might synchronize multiple collection types: scheduling high-resolution satellite imagery collection during predicted equipment movement windows, coordinating SIGINT collection to capture associated communications, maintaining continuous OSINT monitoring of relevant shipping manifests and corporate registries, while automatically adjusting collection priorities based on detected activities. The system might also implement automated tipping and cueing between collection assets—for instance, using SIGINT detection of specific communication patterns to trigger automated high-resolution imagery collection of associated facilities. When the CNO Analysis component's pattern detection module identifies significant network activities, it automatically triggers the satellite data acquisition optimization platform through the collection strategy generator to task high-resolution imagery collection. These automated collection adjustments are managed through the live context data aggregator, which maintains continuous situational awareness across all collection assets while updating the Common Intelligence Picture with new findings. This integrated approach ensures comprehensive intelligence gathering while maintaining synchronization across all collection disciplines through automated workflow management and continuous quality assurance monitoring.

Collected intelligence undergoes initial processing through the containerized analytics workbench (phase 3) 1730, which executes workflows based on courses of action from the multi-source intelligence fusion system LLM. The workbench implements sophisticated data preparation and enhancement capabilities through containerized microservices that maintain processing traceability to original PIR requirements applying automated data normalization to standardize formats across different intelligence sources, initial exploitation algorithms to extract key information, and quality enhancement procedures to improve data usability. For each intelligence type, the workbench applies specialized processing chains. For instance, satellite imagery might undergo automatic atmospheric correction to compensate for specific atmospheric conditions, advanced contrast enhancement to improve ATR performance, and automated orthorectification to ensure precise geolocation for multi-source correlation. SIGINT data flows might be processed through advanced signal cleaning algorithms to remove interference, followed by automated signal characterization and pattern matching aligned with collection requirements. When processing radar data, the system applies sophisticated algorithms for speckle reduction, automated change detection, and feature extraction optimized for integration with other intelligence sources. The workbench prepares all processed data for detailed analysis while maintaining data integrity and source attribution, automatically generating quality metrics and confidence assessments for each processed intelligence item.

The processing phase may begin as collected intelligence flows into the containerized analytics workbench, which executes sophisticated workflows orchestrated by directives from the multi-source intelligence fusion system. The workbench's visual workflow builder engine translates these courses of action into executable processing chains through its task library, while the workflow validator ensures alignment with original PIR requirements. The workflow automation engine coordinates processing across multiple intelligence types through its orchestrator component, managing complex data flows while maintaining processing priorities established by the original PIRs. The containerized analytics module implements specialized processing chains for each intelligence type through its modular architecture. For satellite imagery, the processing chain interfaces with the inference engine's GPU-accelerated processing capabilities to perform atmospheric correction, leveraging space weather data from the space domain awareness system for calibration. The workbench's computer vision processing module applies advanced contrast enhancement optimized for the automated target recognition system's deep learning models, while maintaining precise geolocation through integration with the space domain awareness system's orbital parameters. For SIGINT processing, the workbench coordinates with the CNO Analysis component's signal processing capabilities, implementing advanced cleaning algorithms through the pattern detection module while the behavioral analysis module performs automated signal characterization. Radar data undergoes specialized processing through the capability catalog's algorithm suite, applying speckle reduction and change detection algorithms maintained in the detection algorithms repository. Throughout these operations, the quality assurance module continuously validates processing results, with the performance metrics component tracking key indicators while the model validation system ensures processing accuracy. The workflow automation engine maintains synchronized data flows through its scheduler component, while the monitor tracks processing status and resource utilization. Processed intelligence flows through the fusion engine for temporal alignment before integration into the Common Intelligence Picture, with the multi-source intelligence fusion system maintaining continuous correlation across intelligence types. The processing architecture maintains dynamic adaptation through feedback from the performance monitor, automatically refining processing parameters through the MLOps pipeline to optimize analytical outcomes while maintaining complete provenance through the version control system.

The workbench orchestrates these data processing workflows maintaining data integrity and source attribution, automatically generating quality metrics and confidence assessment for each processed intelligence item. All processing results are formatted for ingestion into phase 4 analysis through analytics, enabling automated target recognition, pattern analysis, and threat assessment. The system maintains continuous updates to the CIP, ensuring processed intelligence is immediately available for analysis while preserving complete provenance of processing operations. This processing architecture enables dynamic workflow adjustment based on feedback from phase 6, automatically refining processing parameters to improve analytical outcomes.

The analysis phase (phase 4) leverages Analytics 1740 to execute multi-source analysis directives generated by the multi-source intelligence fusion system LLM, implementing advanced pattern recognition and threat detection capabilities based on processed intelligence from phase 3. The analytics engine ingests multi-INT data through the containerized analytics workbench and applies courses of action to conduct sophisticated correlation and pattern analysis. For example, when analyzing technology proliferation activities based on PIR requirements, the system automatically correlates multiple indicators through parallel processing streams: the ATR system detects specific equipment signatures in satellite imagery using computer vision algorithms trained on known examples, while simultaneously the SIGINT processing identifies relevant technical specifications in intercepted communications. The system correlates these findings with vessel movements against historical patterns of concern. These physical and signals intelligence indicators are then fused with OSINT data, correlating changes in online technical job postings or academic publications from associated institutions to build comprehensive activity assessments. In port facility monitoring, analytics employs pattern of life analysis modules that establish detailed behavioral baselines by integrating multiple intelligence feeds. The system tracks typical cargo handling patterns through satellite imagery analysis, correlates vessel berthing durations from maritime tracking data, monitors vehicle movements through persistent surveillance, and analyzes associated communications patterns-enabling rapid identification of anomalous activities that could indicate threats. The system also implements sophisticated network analysis capabilities, automatically mapping relationships between entities, facilities, and activities across all intelligence sources while maintaining traceability to source data in the common intelligence picture. When analyzing industrial activities, it might correlate power consumption patterns derived from infrared imagery with production related communications intercepted through SIGINT, integrates shipping records from OSINT sources, and fuses observed personnel movements to assess operational status. The analytics engine coordinates with multiple system components. Through integration with the inference engine, it applies GPU-accelerated deep learning models to conduct automated target recognition and pattern detection. For example, when analyzing technology proliferation activities, the ATR automatically detects specific equipment signatures in satellite imagery, while feature extraction isolates relevant characteristics from intercepted communications. The containerized analytics workbench contributes through its pattern of life analysis module, which establishes detailed behavioral baselines by integrating multiple intelligence feeds. The dynamic exploitation module enables rapid analysis of time-sensitive intelligence based on course of action priorities. The capability catalog's algorithm catalog provides specialized processing capabilities, with detection algorithms and tracking algorithms working in concert to monitor behavioral patterns. The classification models automatically categorize detected activities according to PIR specifications. The CNO analysis enriches the analysis through its correlation engine, which automatically links cyber activities with physical observations. The physical activity matcher associates network behaviors with real-world events, while the threat pattern matcher evaluates patters against known TTPs. Throughout this process, analytical findings are continuously integrated into the CIP through the fusion engine, which performs temporal alignment of disparate data streams, spatial correlation of observations, and confidence scoring of integrated assessments. For example, when satellite imagery reveals increased vehicle presence, the fusion engine correlates this with RF emission patterns from signals intelligence, integrates relevant OSINT data about facility activities, and matches these against historical patterns to build comprehensive activity assessments. The system maintains sophisticate network analysis capabilities through the CNO analysis intelligence integration subsystem, automatically mapping relationships between entities, facilities, and activities across all intelligence sources. When analyzing industrial activities, it correlates power consumption patterns from infrared with production-related communications intercepted through SIGINT, integrates shipping records from OSINT sources, and fuses observed personnel movements to assess operational status. This comprehensive analysis supports Intelligence product generation is managed through reporting 1750, which ingests analytical outputs from multiple system components to automatically create tailored intelligence products based on specific user requirements and operational needs. For time critical situations, such as detecting unusual activity at a monitored facility, the system generates immediate tactical intelligence summaries that include relevant imagery snippets, signal analysis results, and pattern matching assessments, automatically prioritizing the most significant indicators. For persistent monitoring requirements, the system produces detailed periodic assessments that might include trend analysis of vessel traffic patterns, changes in communication volumes, variations in thermal signatures, and correlation with relevant indicators. When generating strategic assessment reports, the system automatically integrates historical pattern analysis, predictive trending, and confidence assessments for each analytical conclusion. For example, a proliferation monitoring report might include automated analysis of technology transfer patterns, correlation with known proliferation networks, assessment of technical capabilities based on observed activities, and predictive analysis of future capabilities development. The reporting system leverages findings from many components. The containerized analytics workbench, utilizing outputs from its pattern of life analysis, object-based production, and dynamic exploitation modules to generate comprehensive assessments. The inference engine's deep learning models incorporating results from automated target recognition and pattern classification to provide detailed object detection and behavioral analysis. The CNO analysis correlation engine, which enriches products with cyber-physical correlations and threat pattern matching. The multi-source intelligence fusion system's fusion engine, which ensures temporal and spatial alignment of all intelligence data. For time-critical situations, such as detecting unusual activity at a monitored facility, the system generates immediate tactical intelligence summaries through the workflow automation engine. These products automatically integrate: relevant imagery snippets processed through the ATR system; signal analysis results from RF monitoring; pattern matching assessments from the capability catalog's algorithm suite; network traffic analysis from the CNO; automated alerts from the alert management subsystem. For persistent monitoring requirements, the system's processing chain produces detailed periodic assessments that leverage: trend analysis from the pattern recognition algorithms; vessel traffic patterns detected through maritime domain monitoring templates; communication volume analysis from SIGINT data; thermal signature variations from multi-sensor fusion; and indicators correlated through OSINT sources. When generating strategic assessment reports, the system integrates data from multiple analytical pipelines while maintaining direct traceability to the CIP. For example, a proliferation monitoring report combines: technology transfer pattern analysis from multi-source correlation; network relationship mapping from CNO analysis; historical pattern analysis from the containerized analytics workbench; predictive trending using GPU-accelerated machine learning models; and confidence assessments generated by the quality assurance module. Each product maintains complete linkage to source data in the CIP while enforcing appropriate security controls and access restrictions managed through the orchestration layer. The system implements continuous feedback loops through the performance monitor to refine product generation based on user interaction patterns, evolving requirements, and effectiveness metrics.

The dissemination phase 1760 implements sophisticated mechanisms for secure and targeted delivery of intelligence products. The system maintains multiple dissemination pathways with automated handling of classification requirements and access controls. Within the system interface, users can access interactive dashboards showing real-time intelligence updates, dynamic maps with overlaid multi-source intelligence, timeline views of historical patterns and trends, customizable analytical workspaces for detailed investigation, and alert feeds prioritized by user role and requirements. For derivative products delivered outside, the system automatically generates PDF reports with embedded analytics and visualizations, PowerPoint briefings with automated updates as new intelligence arrives, spreadsheet exports for detailed data analysis, geospatial data packages for GIS integration, and standard intelligence information reports (IIRs). When disseminating periodic assessments, the system automatically determines appropriate distribution based on content classification, customer requirements, and established dissemination protocols. For immediate threat warnings, the system might simultaneously push alerts through classified networks to operational commands while generating appropriate sanitized versions for broader distribution. For example, a maritime activity assessment might be automatically formatted into multiple versions: a comprehensive classified report with detailed technical analysis for intelligence customers delivered within a tactical PowerPoint summary for operational forces, and a sanitized PDF trend analysis for policy makers. Each product maintains direct links to source data in the CIP/COP, enabling users to drill down into detailed intelligence when appropriate access levels exist. The system maintains audit trails of all dissemination actions while automatically monitoring delivery confirmation and access patterns. Through continuous integration with the CIP/COP, all disseminated products remain synchronized with the latest validated intelligence, ensuring consistency across all product formats and delivery mechanisms.

The cycle concludes with an advanced feedback mechanism 1770 that enables continuous system improvement through direct interaction with delivered intelligence products. Feedback can either go directly through the interface or on derivative products such as PDFs and presentations, with all feedback automatically processed to update the CIP/COP. The system implements sophisticated metrics collection and analysis to evaluate the effectiveness of each intelligence cycle phase. For collection operations, it tracks factors such as collection success rates, data quality metrics, and target coverage statistics. Processing effectiveness is measured through quality assessment metrics, processing time statistics, and enhancement result validation. Analysis performance is evaluated through accuracy assessments, correlation success rates, and customer feedback incorporation. As feedback is received on any product format, the system automatically updates relevant data in the CIP/COP, ensuring all users have access to the most current validated intelligence. The system employs machine learning algorithms to continuously refine its analytical models based on operational results and validated intelligence. For example, when monitoring industrial activities, the system might automatically adjust its pattern recognition algorithms based on confirmed activity identifications, refine its anomaly detection thresholds based on validated alerts, and update its predictive models based on observed outcome accuracy. This comprehensive feedback process ensures continuous improvement in intelligence operations while maintaining adaptation to evolving collection requirements and threat patterns.

Exemplary Computing Environment

Figure 9:
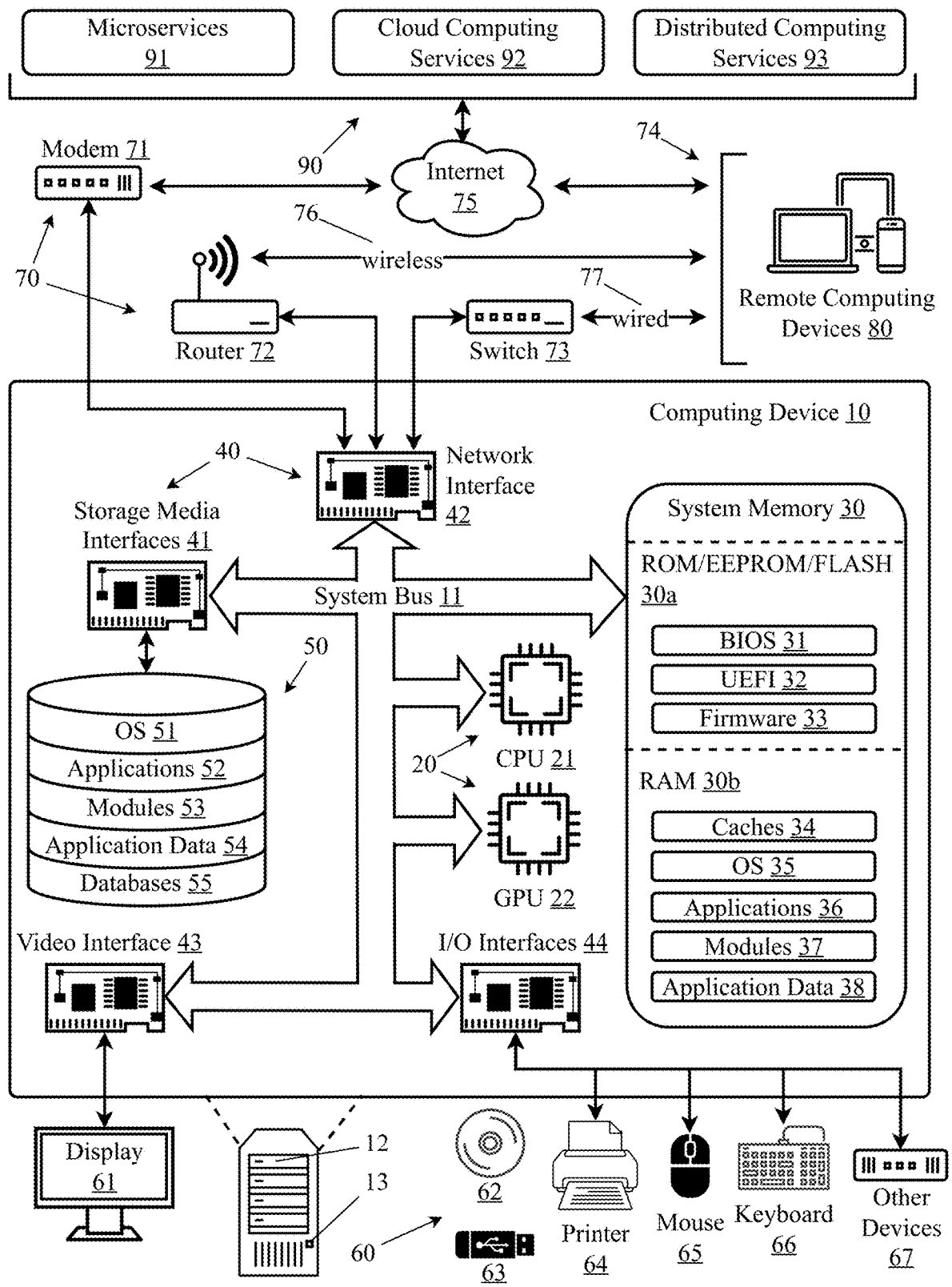
FIG. 9 illustrates an exemplary computing environment on which an embodiment described herein may be implemented.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein. In FIG. 9, computing device 10 further comprises externally-accessible data ports or connections 13 that enable connection of external peripherals and accessories 60. The system memory 30 includes non-volatile memory 30a which stores BIOS 31, Unified Extensible Firmware Interface (UEFI) 32, and firmware 33. UEFI 32 serves as a modern replacement for BIOS that supports larger hard drives, faster boot times, and more security features. Firmware 33 may comprise a complete operating system and applications for operating computer-controlled devices, particularly in purpose-specific computing environments with limited processing power and storage resources.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance. There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, and low latency, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities. NAND flash memory comes in different types, such as Single-Level Cell (SLC), Multi-Level Cell (MLC), Triple-Level Cell (TLC), and Quad-Level Cell (QLC), each with trade-offs between performance, and endurance. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92.

Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as performance and availability. For example, Terraform can be used to automatically provision and scale resources on AWS spot instances during periods of high demand, such as for surge rendering tasks, to take advantage while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a container file or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for a modular open system architecture for common intelligence picture generation, the computing system comprising:
   one or more hardware processors configured for:
      receiving and processing priority intelligence requirements (PIRs) through a multi-intelligence fusion system large language model (LLM) configured to:
         parse and analyze requirements to identify collection parameters and priorities;
         generate courses of action for intelligence collection operations that maximize collection success rates while minimizing resource usage based on predefined operational constraints;
         identify and rank collection assets and data sources based on requirement specifications;
         maintain continuous learning from historical collection outcomes to select assets based on historical performance metrics including successful collection rate and data quality scores;
      executing multi-phase intelligence processing comprising:
         planning intelligence collection operations through LLM-enhanced automated requirement analysis and defining collection strategies that maximize target coverage while minimizing resource allocation;
         collection of data through artificial intelligence (AI)-coordinated tasking of satellite, signal intelligence platforms, and open-source intelligence resources;
         processing collected data through containerized analytics workflows;
      analyzing the processed data through hybrid machine learning models;
         combining computer vision and natural language processing;
         dissemination of analyzed intelligence through context-aware intelligence product generation;
         feedback through automated refinement mechanisms;
         calculating collection feasibility by analyzing requirements against an integrated collection infrastructure including orbital coverage and revisit frequency;
         identifying available collection assets by querying a multi-modal collection database comprising data about satellites, signal intelligence platforms, and open-source intelligence resources;
         collecting environmental and operational data including space domain conditions, atmospheric conditions, and terrain factors;
         developing an integrated collection plan through a containerized architecture configured for workflow generation, pattern analysis and dynamic exploitation;
         processing collected intelligence through GPU-accelerated deep learning models for automated target recognition and pattern detection;
         orchestrating multi-source collection by monitoring and assessing feasibility factors including environmental conditions, availability, and collection geometries;
         maintaining domain awareness through integrated monitoring, environmental integration, asset management, and visualization;
         fusing intelligence data across multiple subsystems to correlate findings across multiple intelligence disciplines in a common intelligence picture (CIP);
         implementing automated workflows for intelligence analysis and dissemination while enforcing security controls and privacy protections; and
         generating and updating intelligence products based on continuous collection and feedback integration.

2. The computing system of claim 1, wherein:
   the containerized architecture implements pattern of life analysis, object based production, computer vision processing, and dynamic exploitation through containerized microservices; and
   a multi-source collection optimization processes collections across multiple providers based on physical feasibility constraints and collection conditions.

3. The computing system of claim 1, wherein calculating collection feasibility comprises analyzing collection opportunities, evaluating environmental data, assessing collection capabilities, and determining collection availability through feasibility interfaces.

4. The computing system of claim 1, wherein the environmental and operational data comprises space domain conditions, atmospheric conditions, visibility conditions, and terrain factors.

5. The computing system of claim 1, wherein maintaining domain awareness implements position monitoring, environmental monitoring, asset management for status monitoring and scheduling, and visualization for display and status monitoring.

6. The computing system of claim 1, wherein processing collected intelligence comprises implementing a machine learning system, maintaining a training database, processing collected data, implementing learning algorithms, and adjusting model parameters to improve prediction accuracy based on comparison with historical performance data.

7. The computing system of claim 1, wherein the multi-modal collection database includes data comprising resolution capabilities, spectral capabilities, imaging capabilities, collection parameters, coverage limitations, and sensor configurations.

8. A computer-implemented method for operating a modular open system architecture for common intelligence picture generation, the computer-implemented method comprising the steps of:
- receiving and processing priority intelligence requirements (PIRs) through a multi-intelligence fusion system large language model (LLM) configured to:
  - parse and analyze requirements to identify collection parameters and priorities;
  - generate courses of action for intelligence collection operations that maximize collection success rates while minimizing resource usage based on predefined operational constraints;
  - identify and rank collection assets and data sources based on requirement specifications;
  - maintain continuous learning from historical collection outcomes to select assets based on historical performance metrics including successful collection rate and data quality scores;
- executing multi-phase intelligence processing comprising:
  - planning intelligence collection operations through LLM-enhanced automated requirement analysis and defining collection strategies that maximize target coverage while minimizing resource allocation;
  - collection of data through artificial intelligence (AI)-coordinated tasking of satellite, signal intelligence platforms, and open-source intelligence resources;
  - processing collected data through containerized analytics workflows;
  - analyzing the processed data through hybrid machine learning models;
  - combining computer vision and natural language processing;
  - dissemination analyzed intelligence through context-aware intelligence product generation;
  - feedback through automated refinement mechanisms;
  - calculating collection feasibility by analyzing requirements against an integrated collection infrastructure including orbital coverage and revisit frequency;
  - identifying available collection assets by querying a multi-modal collection database comprising data about satellites, signal intelligence platforms, and open-source intelligence resources;
  - collecting environmental and operational data including space domain conditions, atmospheric conditions, and terrain factors;
  - developing an integrated collection plan through containerized architecture configured for workflow generation, pattern analysis and dynamic exploitation;
  - processing collected intelligence through GPU-accelerated deep learning models for automated target recognition and pattern detection;
  - orchestrating multi-source collection by monitoring and assessing feasibility factors including environmental conditions, availability and collection geometries;
  - maintaining domain awareness through integrated monitoring, environmental integration, asset management and visualization;
  - fusing intelligence data across multiple subsystems to correlate findings across multiple intelligence disciplines in a common intelligence picture (CIP);
  - implementing automated workflows for intelligence analysis and dissemination while enforcing security controls and privacy protections; and
  - generating and updating intelligence products based on continuous collection and feedback integration.

9. The computer-implemented method of claim 8, wherein:
- the containerized architecture implements pattern of life analysis, object-based production, computer vision processing, and dynamic exploitation through containerized microservices; and
- a multi-source collection optimization processes collections across multiple providers based on physical feasibility constraints and collection conditions.

10. The computer-implemented method of claim 8, wherein calculating collection feasibility comprises analyzing collection opportunities, evaluating environmental data, assessing collection capabilities, and determining collection availability through feasibility interfaces.

11. The computer-implemented method of claim 8, wherein the environmental and operational data comprises space domain conditions, atmospheric conditions, visibility conditions, and terrain factors.

12. The computer-implemented method of claim 8, wherein maintaining domain awareness implements position monitoring, environmental monitoring, asset management for status monitoring and scheduling, and visualization for display and status monitoring.

13. The computer-implemented method of claim 8, wherein processing collected intelligence comprises implementing a machine learning system, maintaining a training database, processing collected data, implementing learning algorithms, and adjusting model parameters to improve prediction accuracy based on comparison with historical performance data.

14. The computer-implemented method of claim 8, wherein the multi-modal collection database includes data comprising resolution capabilities, spectral capabilities, imaging capabilities, collection parameters, coverage limitations, and sensor configurations.

* * * * *